US010653267B2

(12) United States Patent
Chanine et al.

(10) Patent No.: US 10,653,267 B2
(45) Date of Patent: May 19, 2020

(54) APPARATUS FOR MAKING BEVERAGES BY PASSING HOT WATER IN A CAPSULE CONTAINING A FOOD SUBSTANCE

(71) Applicant: CAFFITALY SYSTEM S.P.A., Gaggio Montano (Bologna) (IT)

(72) Inventors: Valeriy Chanine, Monza (IT); Italo Andrea Alvarez Virtoli, Rubiera (IT)

(73) Assignee: CAFFITALY SYSTEM S.P.A., Gaggio Montano (IT)

(*) Notice: Subject to any disclaimer, the term of this patent is extended or adjusted under 35 U.S.C. 154(b) by 242 days.

(21) Appl. No.: 15/768,110

(22) PCT Filed: Oct. 7, 2016

(86) PCT No.: PCT/IB2016/056011
§ 371 (c)(1),
(2) Date: Apr. 13, 2018

(87) PCT Pub. No.: WO2017/068448
PCT Pub. Date: Apr. 27, 2017

(65) Prior Publication Data
US 2018/0303272 A1 Oct. 25, 2018

(30) Foreign Application Priority Data

Oct. 22, 2015 (IT) .................. 102015000064543

(51) Int. Cl.
A47J 31/36 (2006.01)
A47J 31/40 (2006.01)
(52) U.S. Cl.
CPC ....... A47J 31/3633 (2013.01); A47J 31/3642 (2013.01); A47J 31/368 (2013.01); A47J 31/407 (2013.01)

(58) Field of Classification Search
CPC .. A47J 31/3633; A47J 31/3642; A47J 31/368; A47J 31/407; A47J 31/4403
See application file for complete search history.

(56) References Cited

U.S. PATENT DOCUMENTS 6,240,832 B1  6/2001 Schmed et al.
7,703,380 B2  4/2010 Ryser et al.
(Continued)

FOREIGN PATENT DOCUMENTS

EP   1721553 B1   12/2008
EP   1757212 B1    8/2009
(Continued)

Primary Examiner — Ryan J. Walters
(74) Attorney, Agent, or Firm — Pearne & Gordon LLP

(57) ABSTRACT

An apparatus for making beverages comprising; an extraction chamber (6) formed between a first part (12) and a second part (13), which are movable; an insertion duct (18) for insertion of a capsule (2), (3) in the extraction chamber (6), the insertion duct extending from an infeed section (19) equipped with a closing element (20) that is movable between a closed position and a disengaged position, and that is in the closed position when the extraction chamber (6) is closed; and at least one first supporting element (21) positioned upstream of the infeed section (19), for supporting a second capsule (3) outside the extraction unit (5) while a first capsule (2) is positioned at the extraction chamber (6); the first supporting element (21) being mechanically switchable, by one of either the first part (12) or the second part (13) or the closing element (20), from an active configuration in which it can support the capsule (2), (3), to an inactive configuration which it adopts when the first part (12) and the second part (13) are in the extraction position.

20 Claims, 22 Drawing Sheets

(56) References Cited

U.S. PATENT DOCUMENTS

| | | |
|---|---|---|
| 7,793,797 B2 * | 9/2010 | Jarisch ................ A47J 31/3642 |
| | | 221/188 |
| 8,425,963 B2 | 4/2013 | Ryser et al. |
| 8,613,246 B2 | 12/2013 | Ryser et al. |
| 9,392,901 B2 | 7/2016 | Ryser et al. |
| 9,635,973 B2 | 5/2017 | Degli Esposti Venturi |
| 9,788,683 B2 | 10/2017 | Degli Esposti Venturi |
| 9,834,370 B2 * | 12/2017 | Fischer ................ A47J 31/407 |
| 2006/0230941 A1 | 10/2006 | Ryser et al. |
| 2010/0071563 A1 | 3/2010 | Ryser et al. |
| 2010/0173053 A1 | 7/2010 | Ryser et al. |
| 2014/0069281 A1 | 3/2014 | Ryser et al. |
| 2014/0238246 A1 | 8/2014 | Degli Esposti Venturi |
| 2014/0345469 A1 | 11/2014 | Degli Esposti Venturi |
| 2016/0174752 A1 | 6/2016 | Casiddu |
| 2019/0021543 A1 * | 1/2019 | Accursi ................ A23F 5/262 |

FOREIGN PATENT DOCUMENTS

| | | |
|---|---|---|
| EP | 2301394 A1 | 3/2011 |
| WO | 2013042011 A1 | 3/2013 |
| WO | 2015019248 A1 | 2/2015 |
| WO | 2015019249 A1 | 2/2015 |
| WO | 2015036850 A1 | 3/2015 |

\* cited by examiner

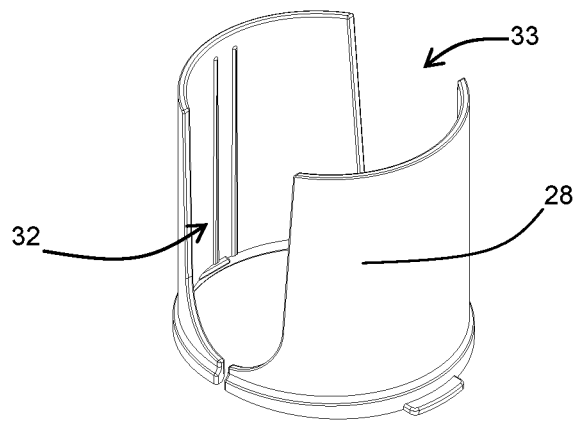
FIG. 23
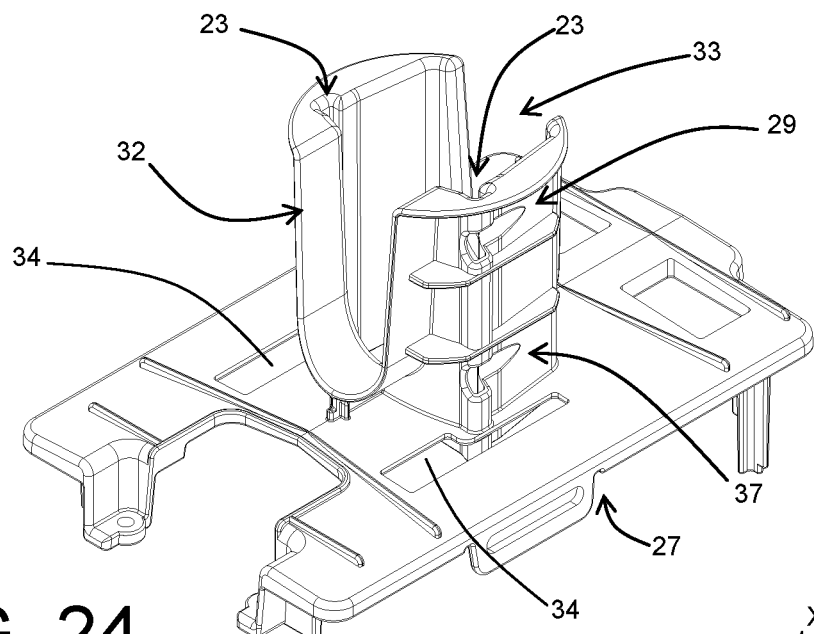
FIG. 24
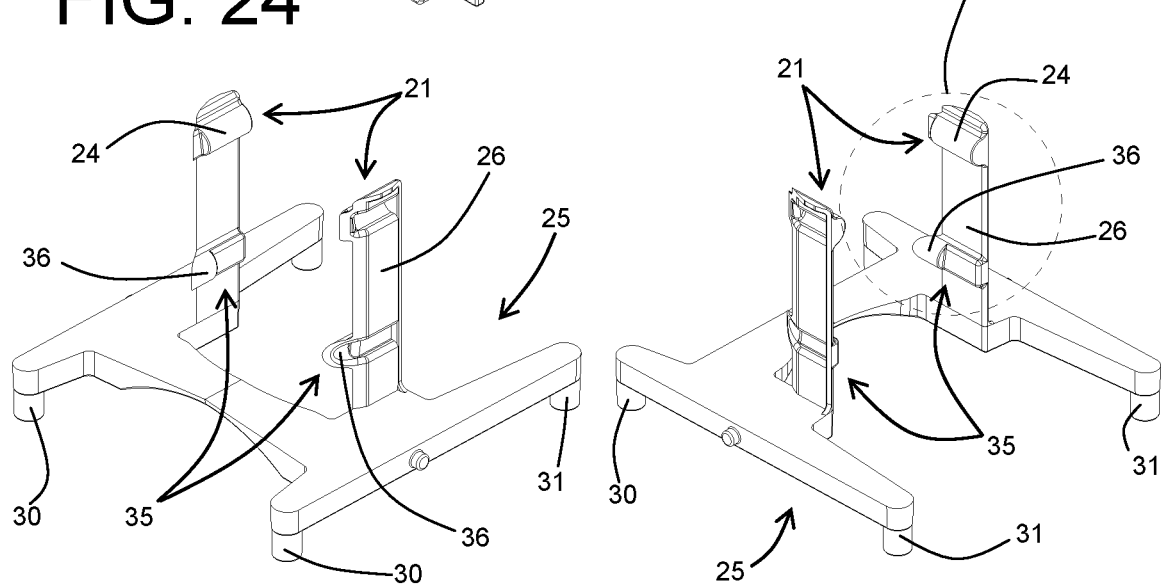
FIG. 25a
FIG. 25b

APPARATUS FOR MAKING BEVERAGES BY PASSING HOT WATER IN A CAPSULE CONTAINING A FOOD SUBSTANCE This invention relates to an apparatus for making beverages by passing hot water in a capsule containing a food substance.

In particular, this invention is for apparatuses able to automatically supply two beverages one after another using two single-dose capsules. That operating method may be used both for making a double quantity of beverage for a single user (for example, a double coffee), or for making two beverages simultaneously, using an outfeed spout with double outlet, typical of any prior art coffee machine or the like.

An apparatus able to automatically make two beverages is the subject matter of patent application WO 2013/042011 by this Applicant. U.S. Pat. No. 6,240,832 discloses an assembly for feeding prepackaged coffee portions to a brewing unit of a coffee machine. That assembly has a magazine adapted to receive the coffee portion to be brewed. The magazine is rotatable and adapted to receive a plurality of cartridges, each containing a coffee portion. Further, there is provided a device for individually feeding the coffee portions into the brewing unit. The device for individually feeding the coffee portions comprises two latch members rotatable around respective central axes and which, at their lower side, have a first support surface for catching the coffee portions ready to be dispensed, and at their upper side, have a second support surface for supporting the succeeding coffee portion.

By means of a rocking lever member, actuated by an electromagnet two actuating rod members can be driven in upwards direction, opposite to the force of a spring member, with the result that the latch members are rotated in opposite direction to release the lowermost coffee portion while the subsequent coffee portion is fixed in a ready position.

The assembly of U.S. Pat. No. 6,240,832 also comprises a drawer member adapted to manually feed a single coffee portion instead of using the device for individually feeding a coffee portion from the magazine into the brewing unit.

This invention is intended, in particular, to provide an apparatus in which a user who wants to make the two beverages one after another can load the apparatus with both capsules to be used, before starting to supply the beverages. That avoids having to wait until supplying of the first beverage has been completed, or even just started.

The need to do that is particularly felt where the apparatus is of the professional type, or in any case is intended for professional use. In fact, in such cases, the person using the apparatus is usually a person assigned several tasks (typically he or she may be the bartender), so time is precious and therefore he or she cannot waste time waiting to put the second capsule in the machine.

Although this is the main context for which this invention was devised, the invention may in any case have other applications for making single beverages, simply allowing the user to have a capsule available ready for use, already loaded in the machine.

In this context the technical purpose which forms the basis of this invention is to provide an apparatus for making beverages by passing hot water in a capsule containing a food substance, which overcomes the above-mentioned disadvantages.

In particular, the technical purpose of this invention is to provide an apparatus for making beverages by passing hot water in a capsule containing a food substance, that allows two capsules to be loaded in the apparatus before starting the supplying cycle.

Furthermore, the technical purpose of this invention is to provide an apparatus for making beverages by passing hot water in a capsule containing a food substance, that allows two beverages to be made one after another using two capsules, in a completely automatic way.

The technical purpose and the aims indicated are substantially fulfilled by an apparatus for making beverages by passing hot water in a capsule containing a food substance in accordance with what is described in the appended claims.

Further features and the advantages of this invention are more apparent in the detailed description, with reference to the accompanying drawings which illustrate several preferred, non-limiting embodiments of an apparatus for making beverages by passing hot water in a capsule containing a food substance, in which.

Figure 1:
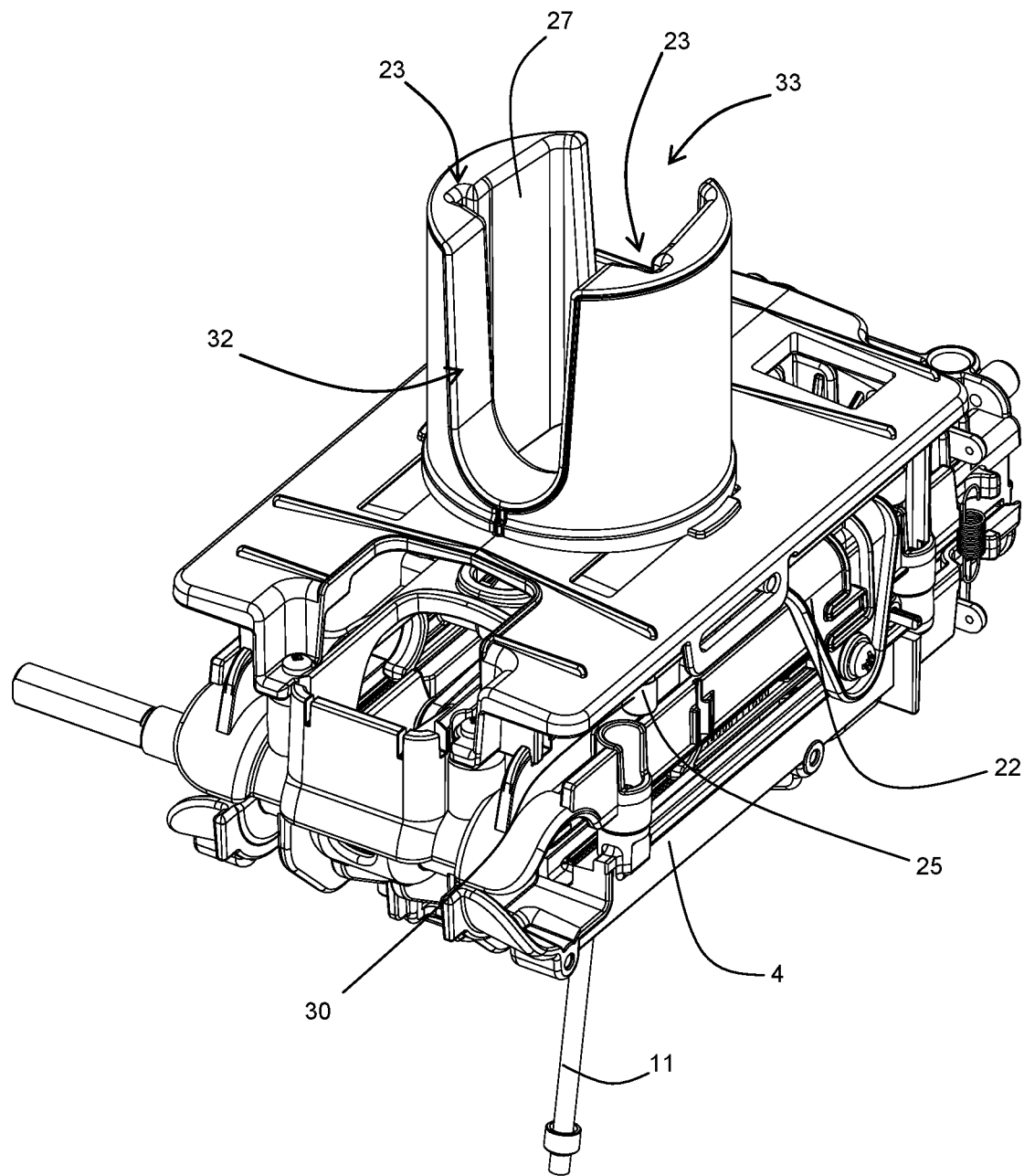
FIG. 1 is an axonometric view of a main part of an apparatus made in accordance with a first embodiment of this invention.
Figure 2:
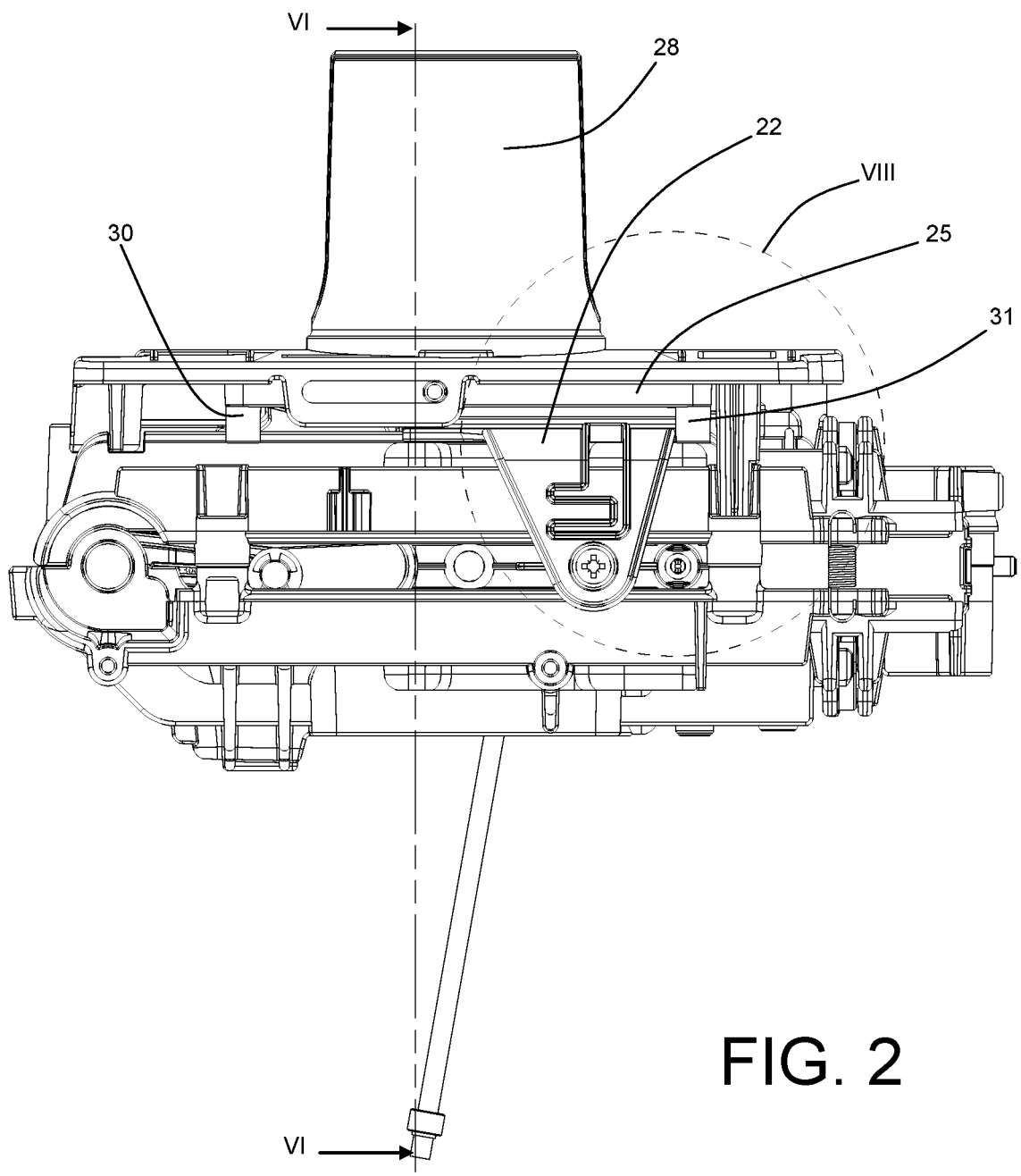
FIG. 2 is a side view of the part of the apparatus of FIG. 1.
Figure 3:
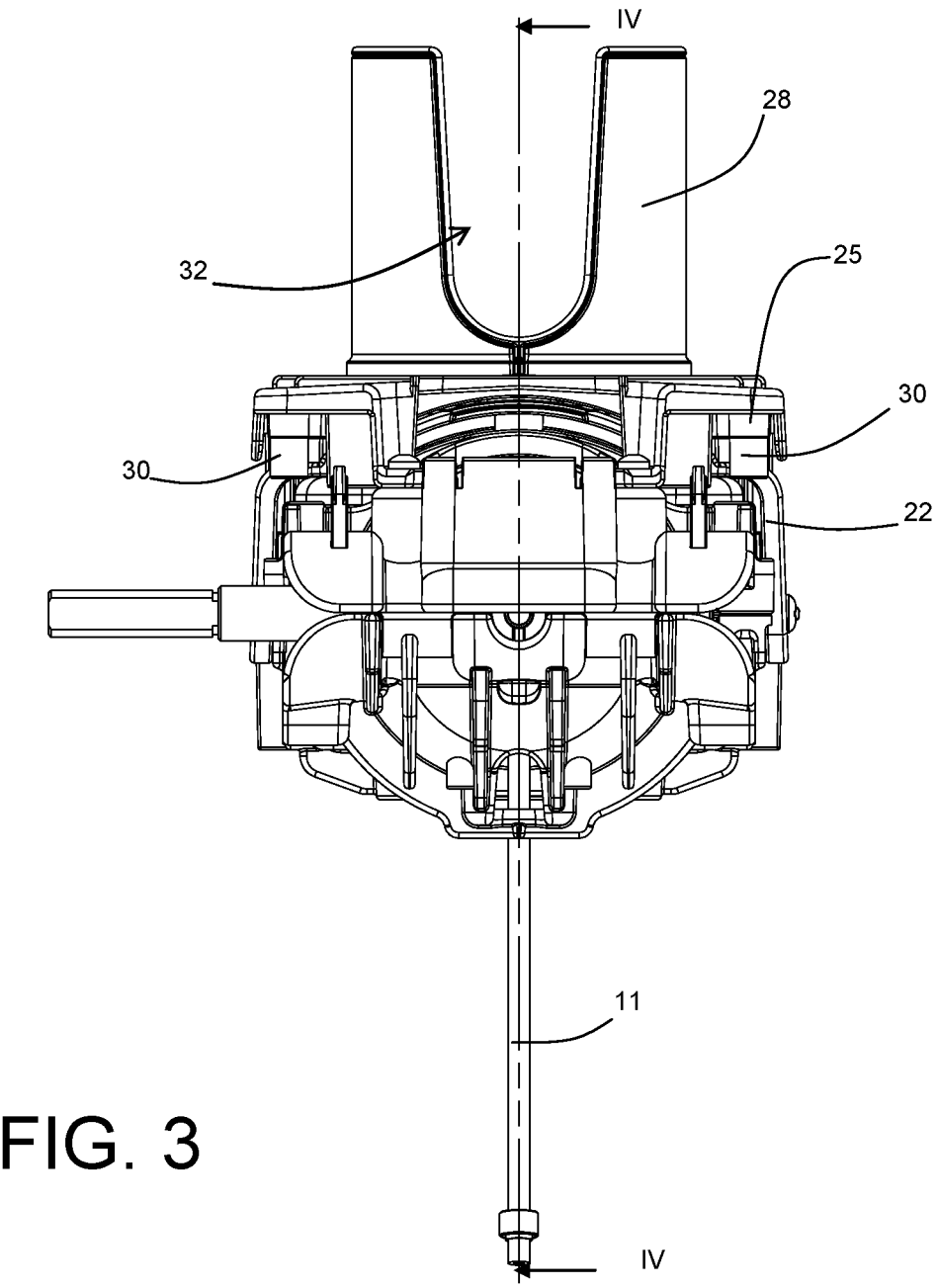
FIG. 3 is a front view of the part of the apparatus of FIG. 1.
Figure 4:
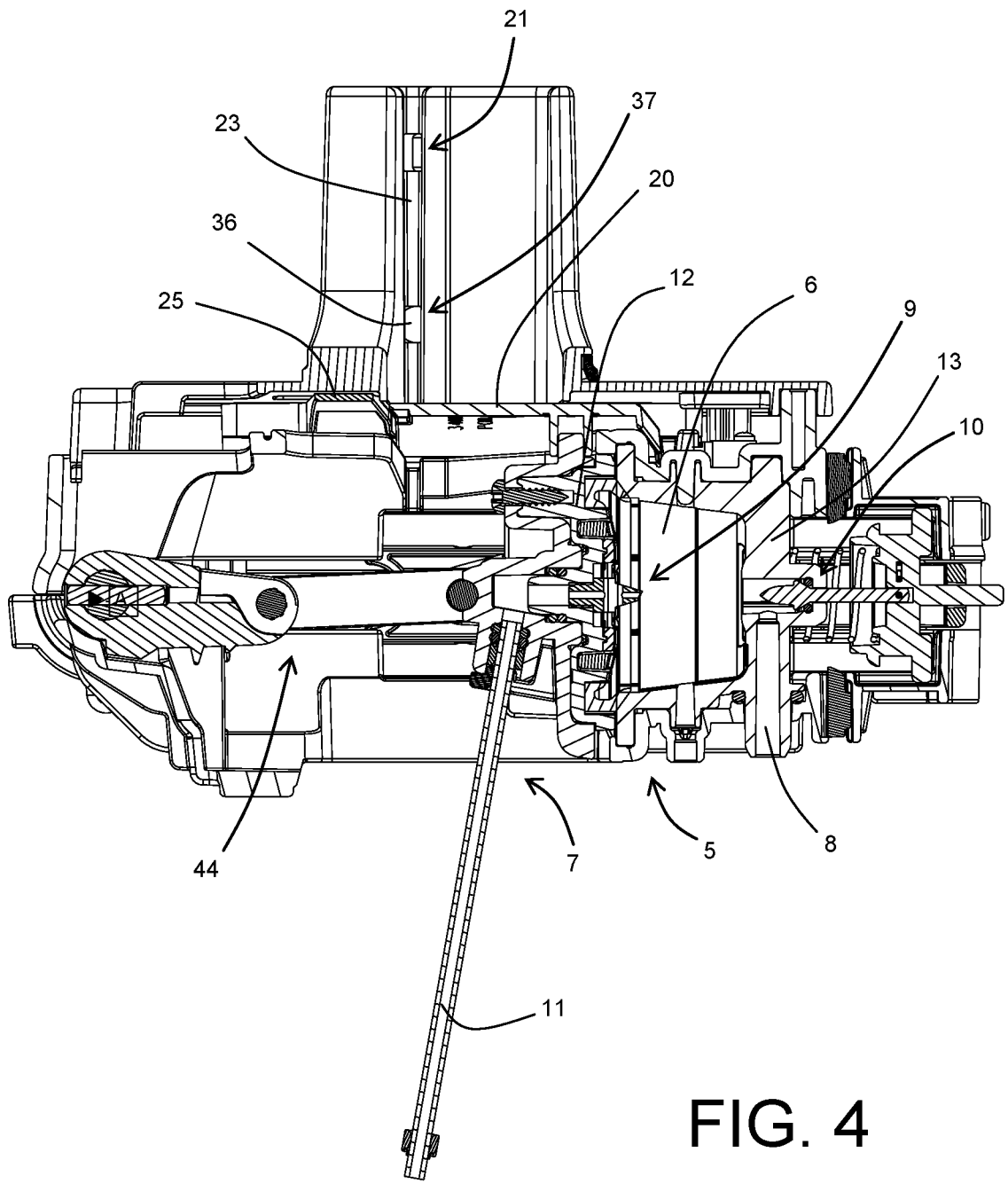
FIG. 4 shows the part of the apparatus of FIG. 1 in section according to the line IV-IV of FIG. 3.
Figure 5:
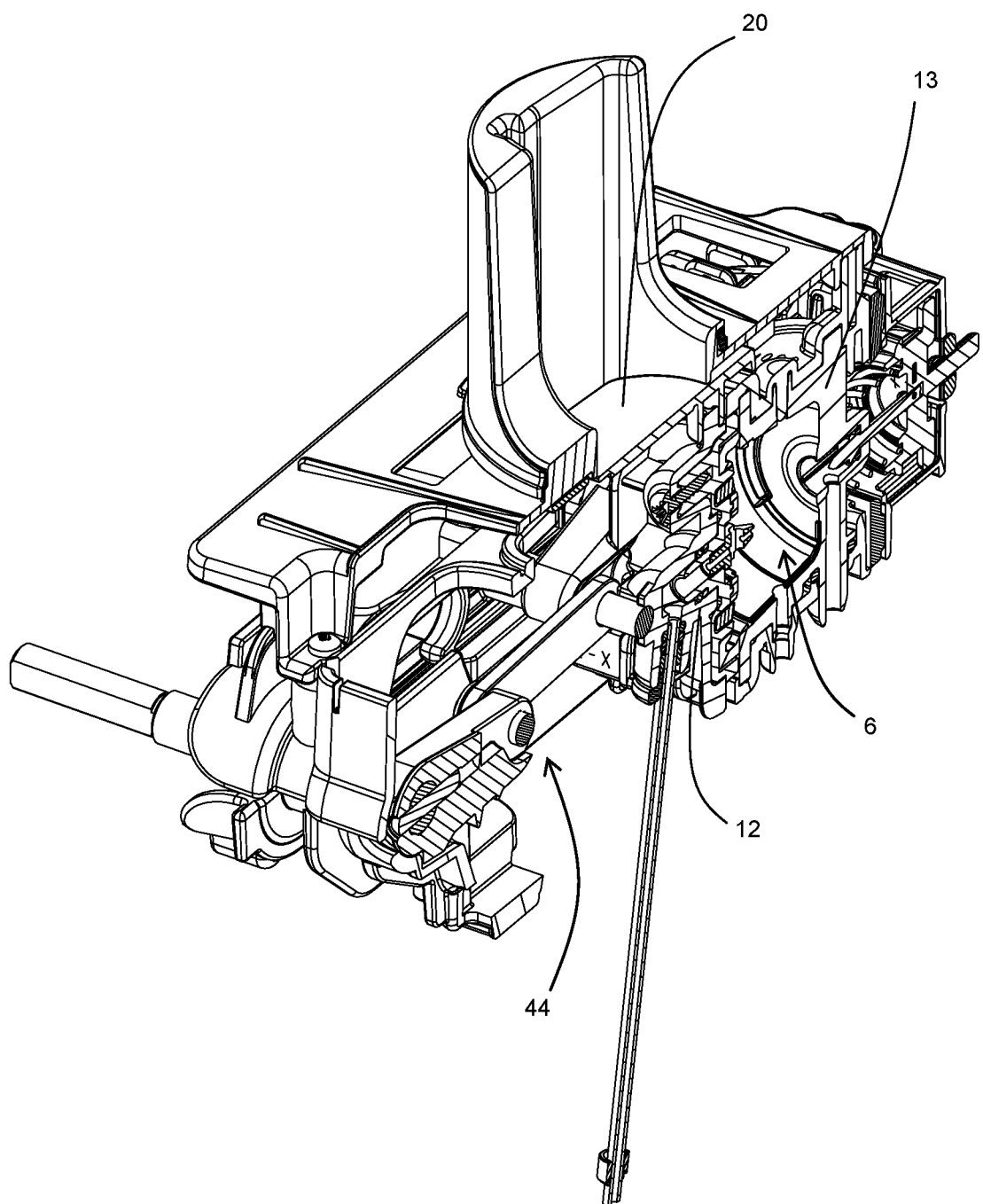
FIG. 5 is an axonometric view of the part of the apparatus in section of FIG. 4.
Figure 6:
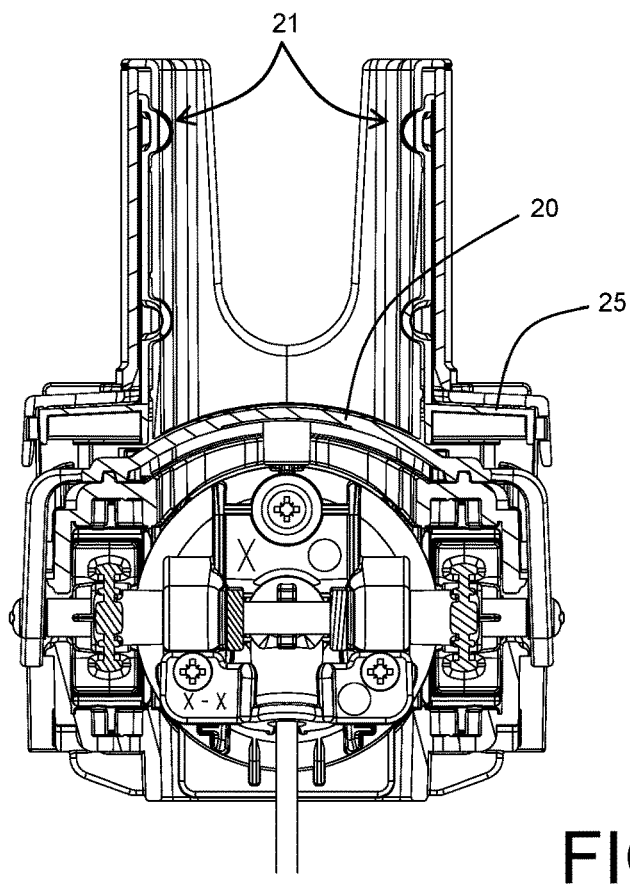
FIG. 6 shows the part of the apparatus of FIG. 1 in section according to the line VI-VI of FIG. 2.
Figure 7:
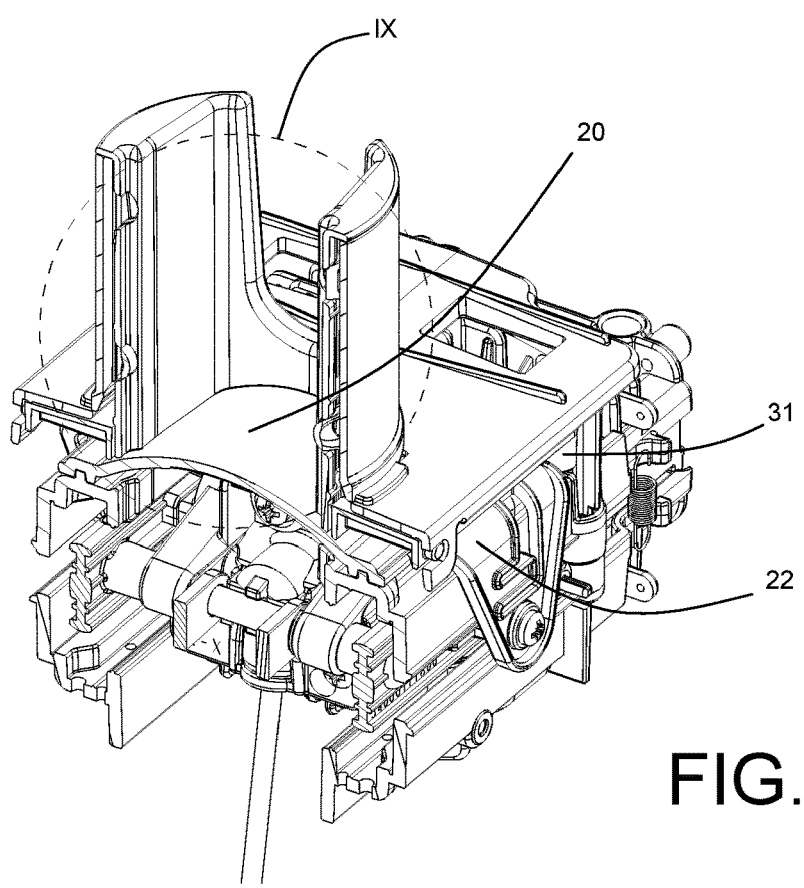
FIG. 7 is an axonometric view of the part of the apparatus in section of FIG. 6.
Figure 8:
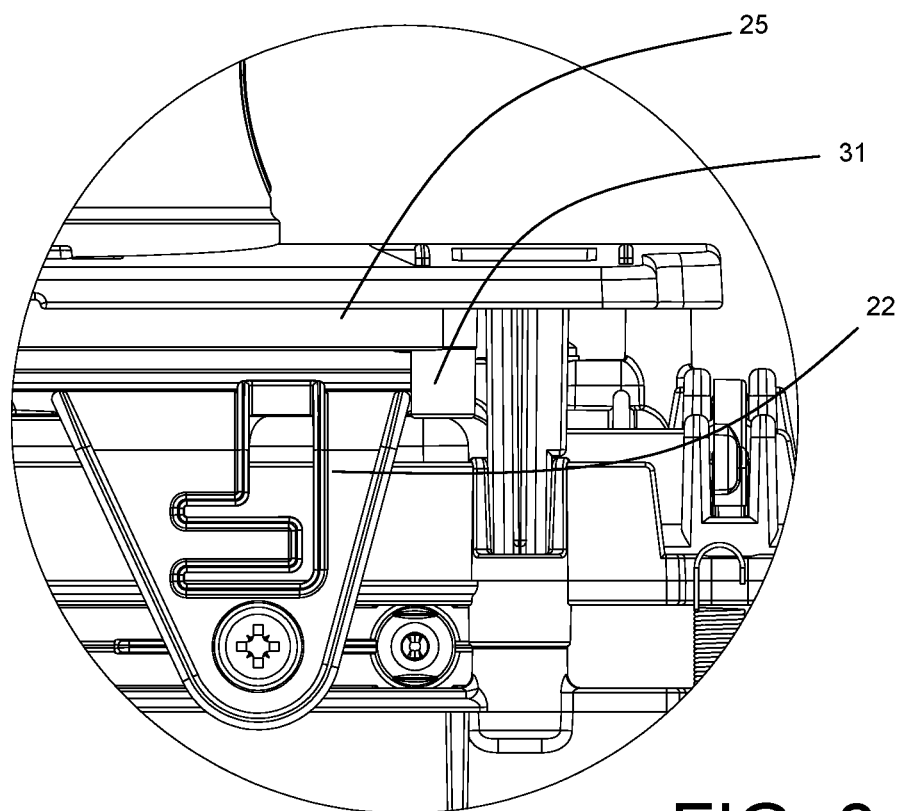
FIG. 8 is an enlarged view of the detail VIII of FIG. 2.
Figure 9:
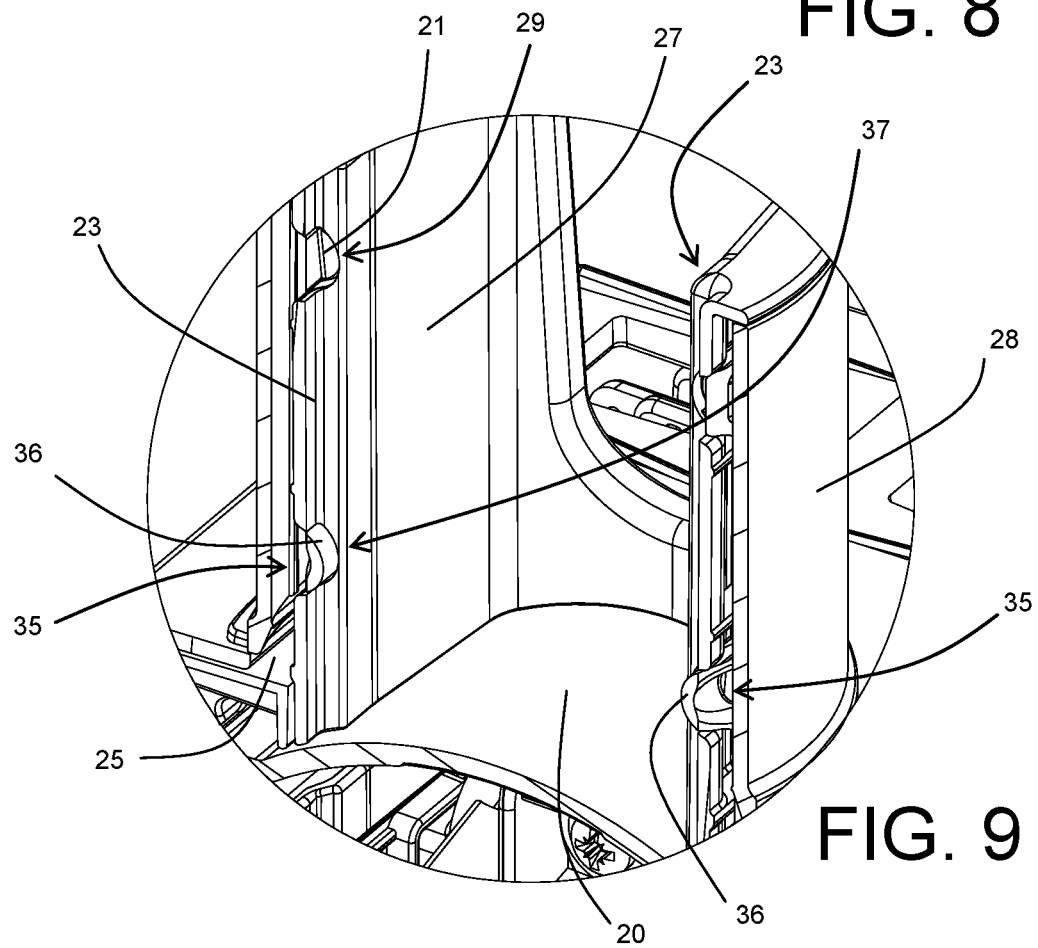
FIG. 9 is an enlarged view of the detail IX of FIG. 7.
Figure 27:
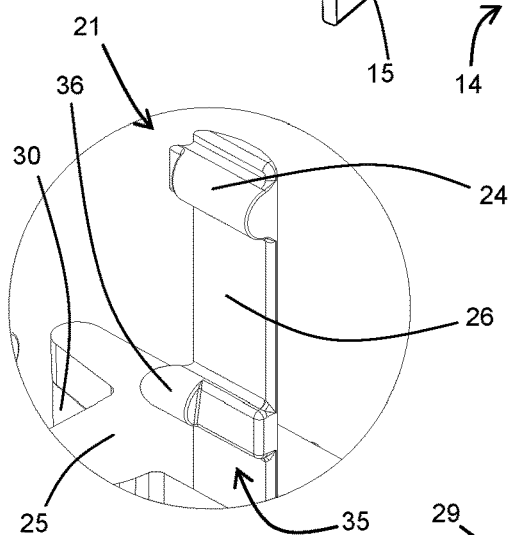
Figure 26:
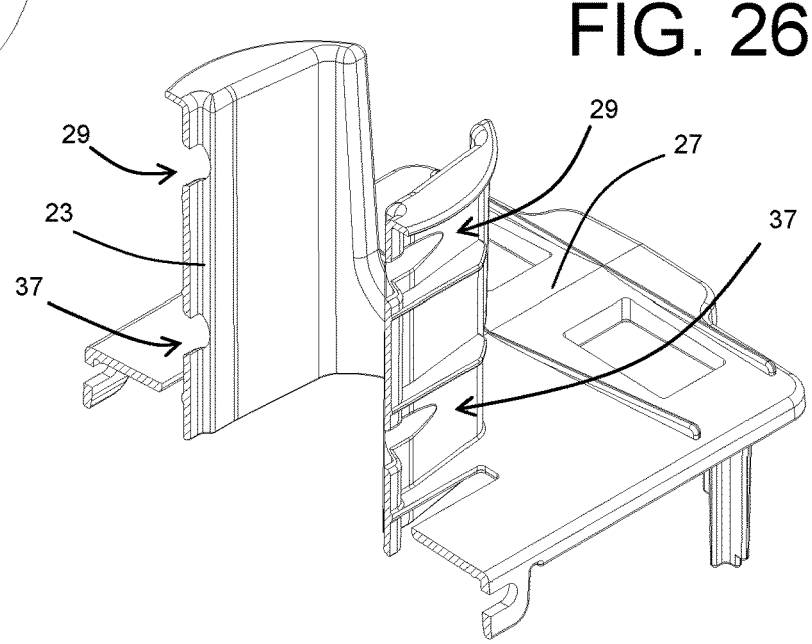
Figure 28:
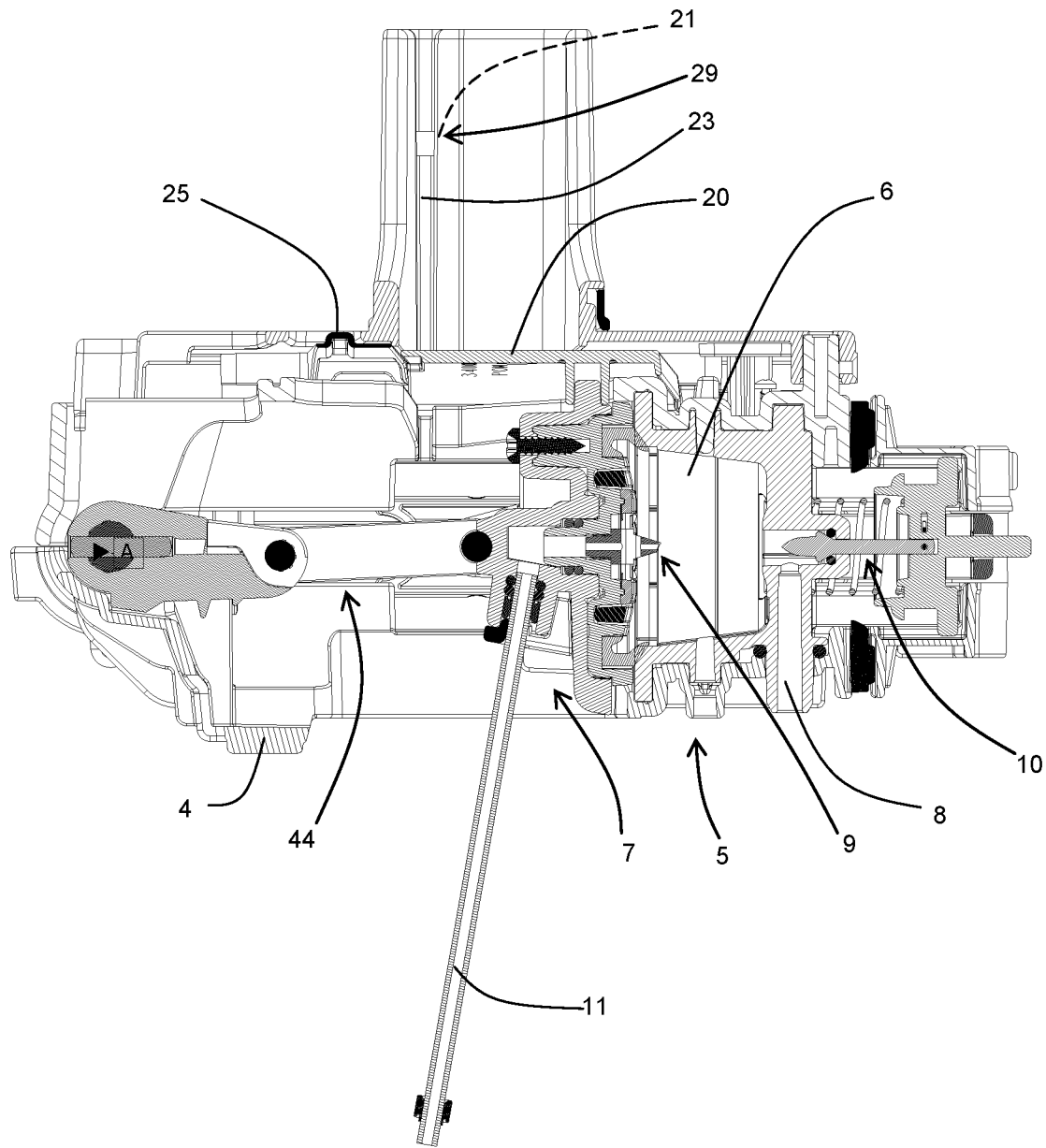
Figure 29:
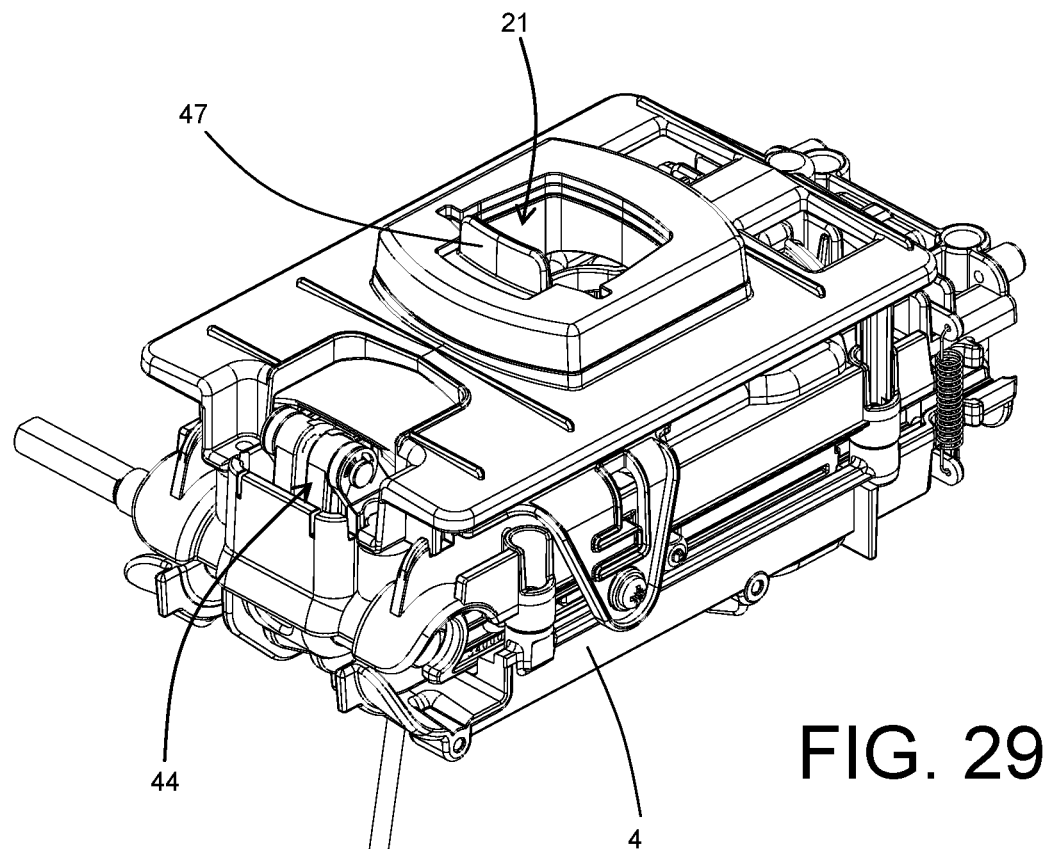
Figure 30:
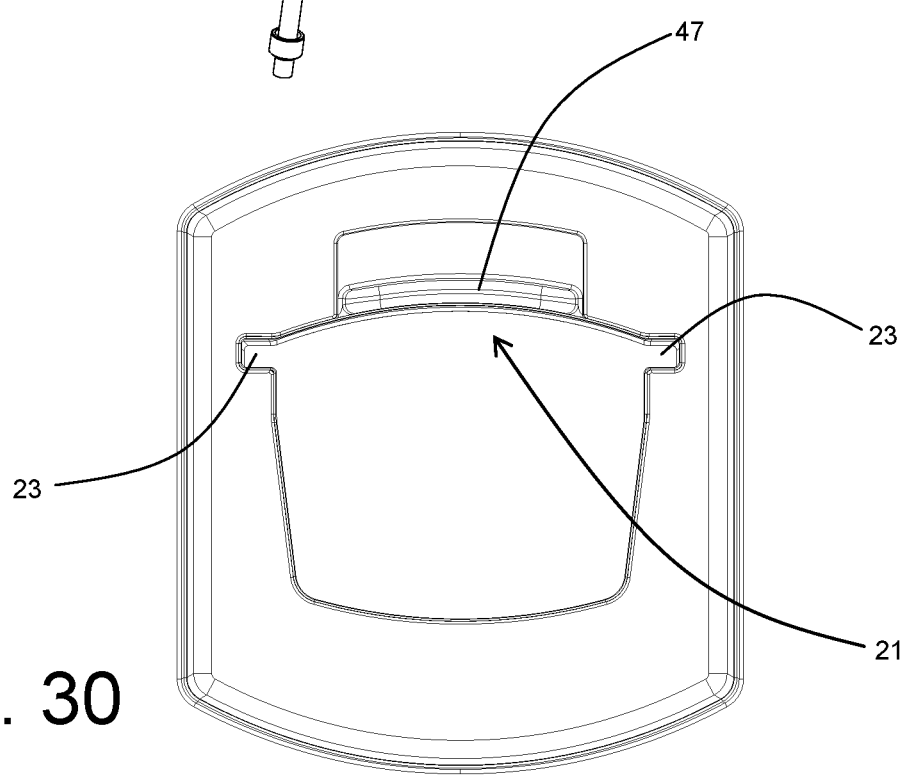
Figure 31:
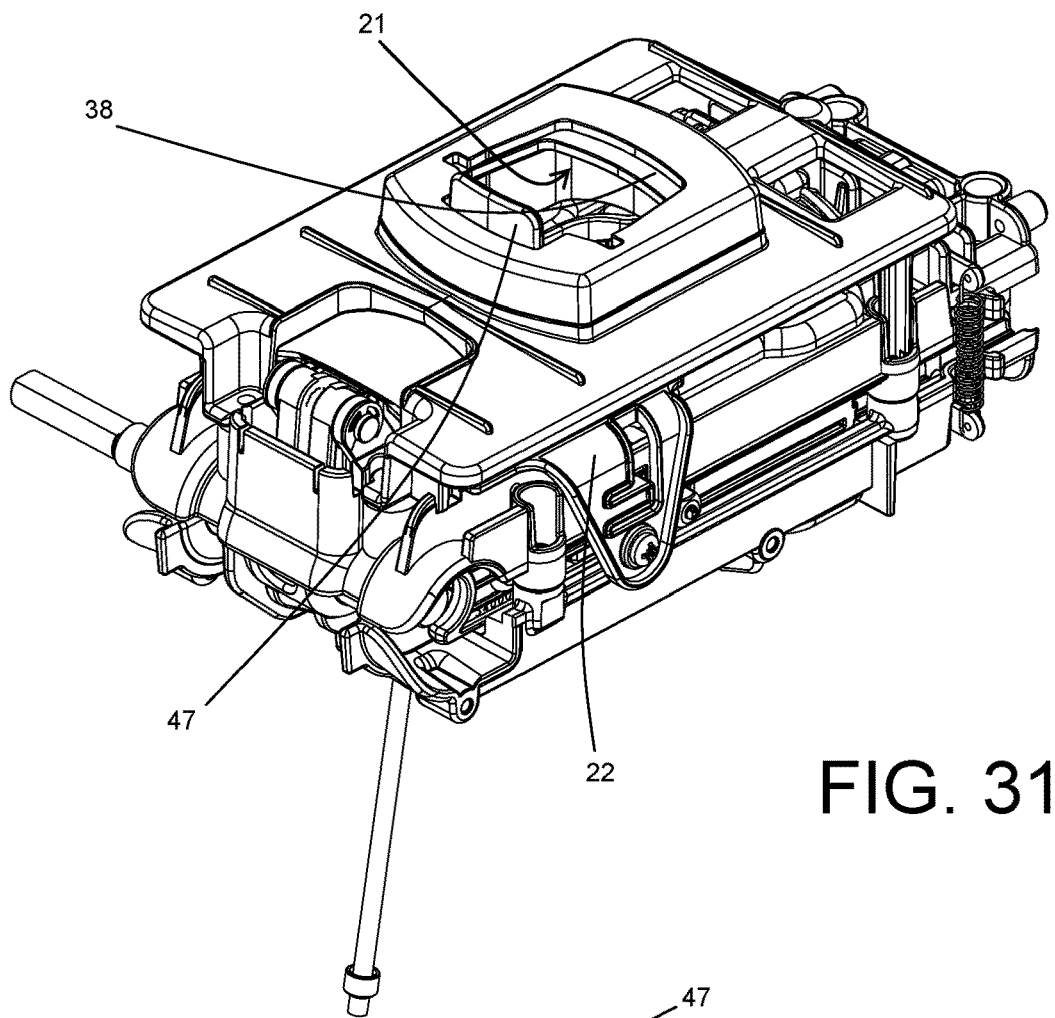
Figure 32:
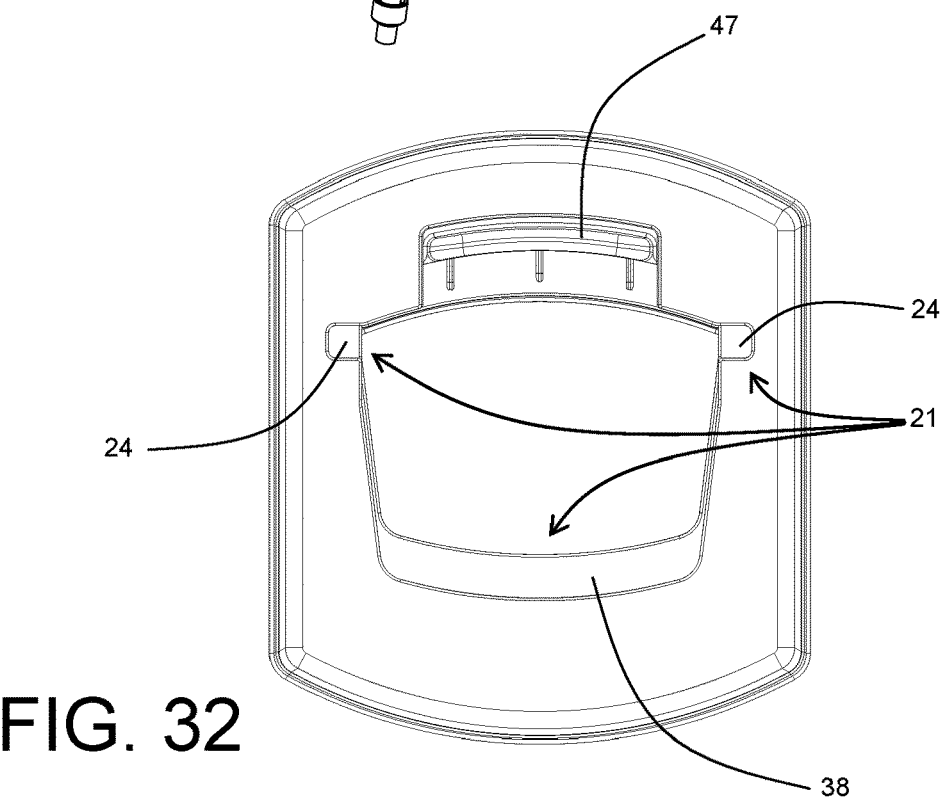
Figure 33:
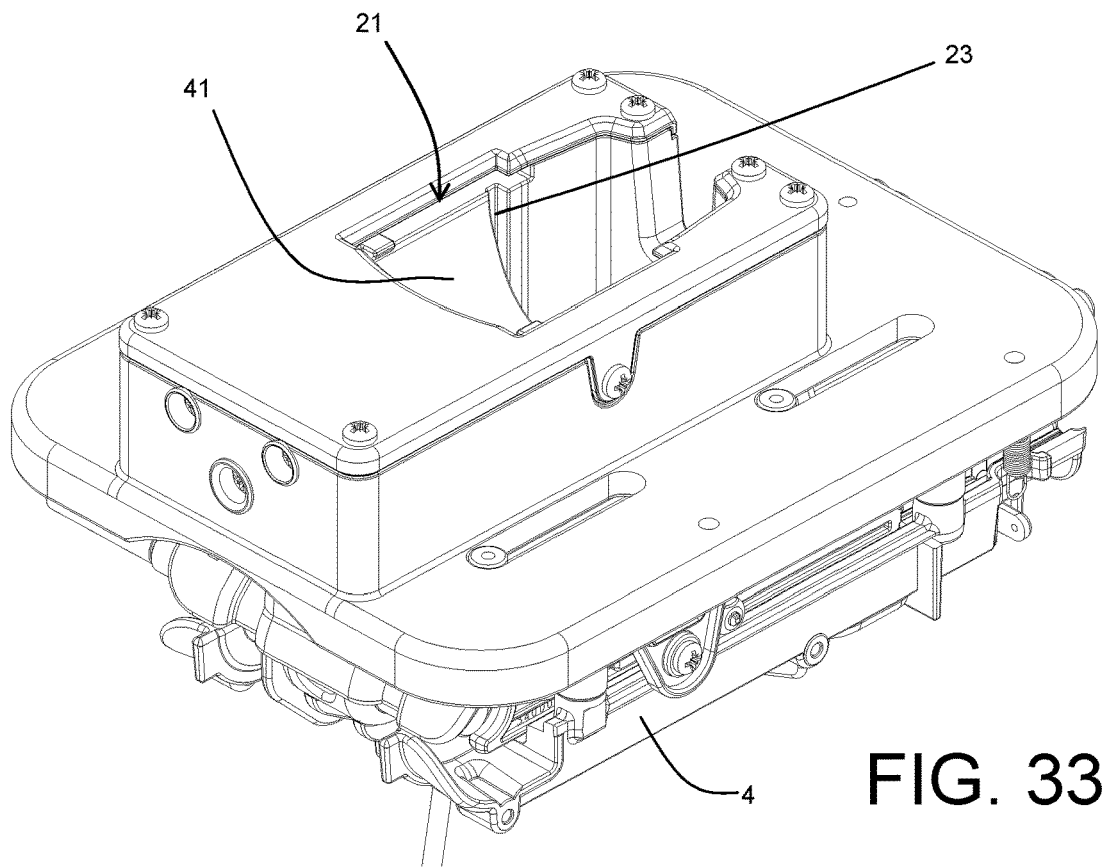
Figure 34:
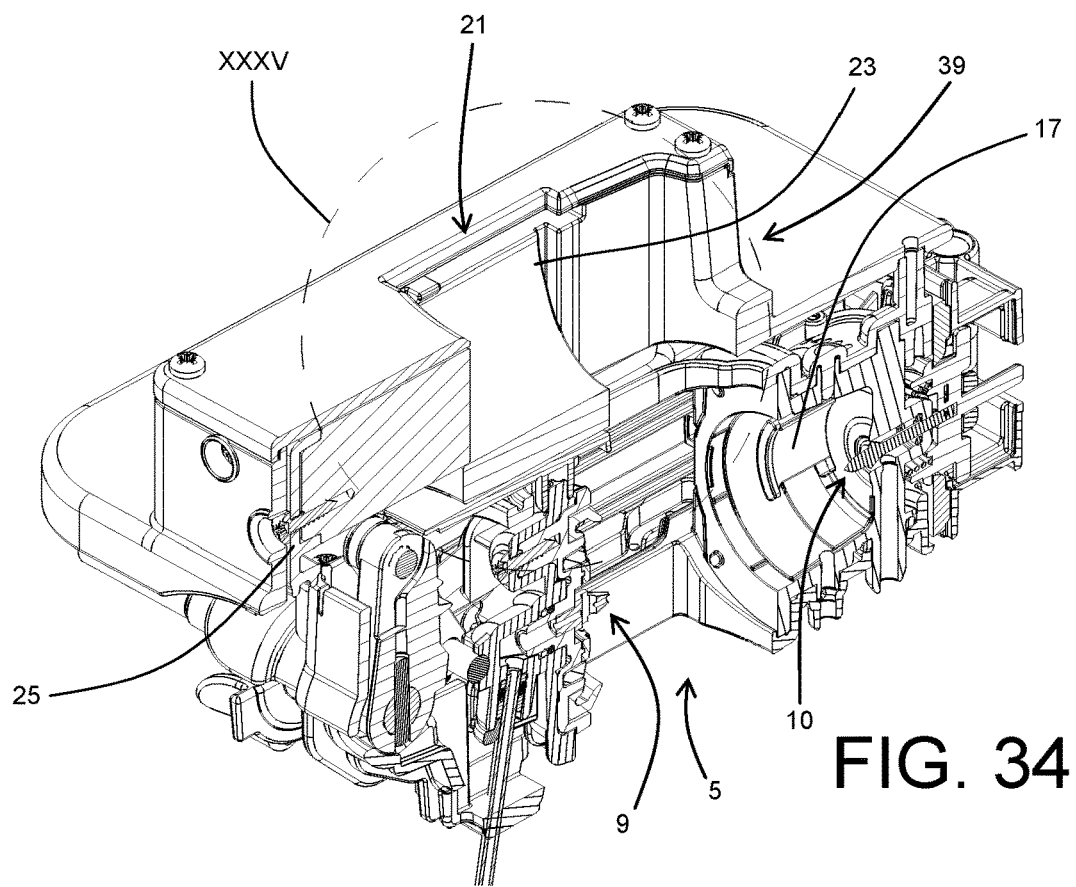
Figure 35:
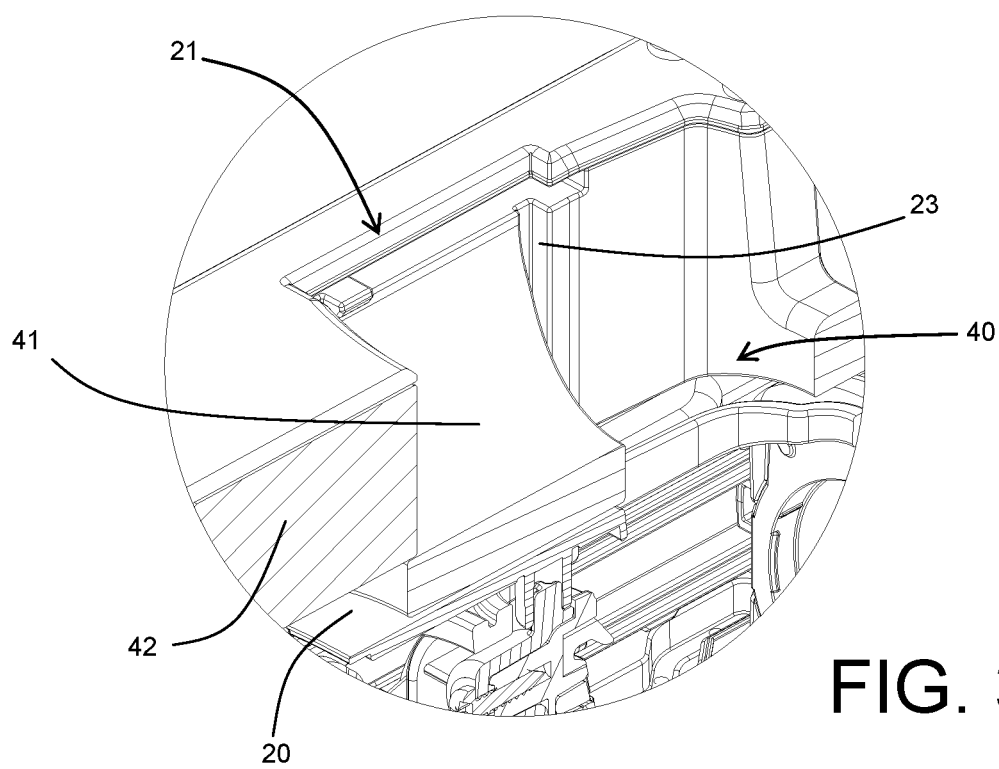
Figure 36:
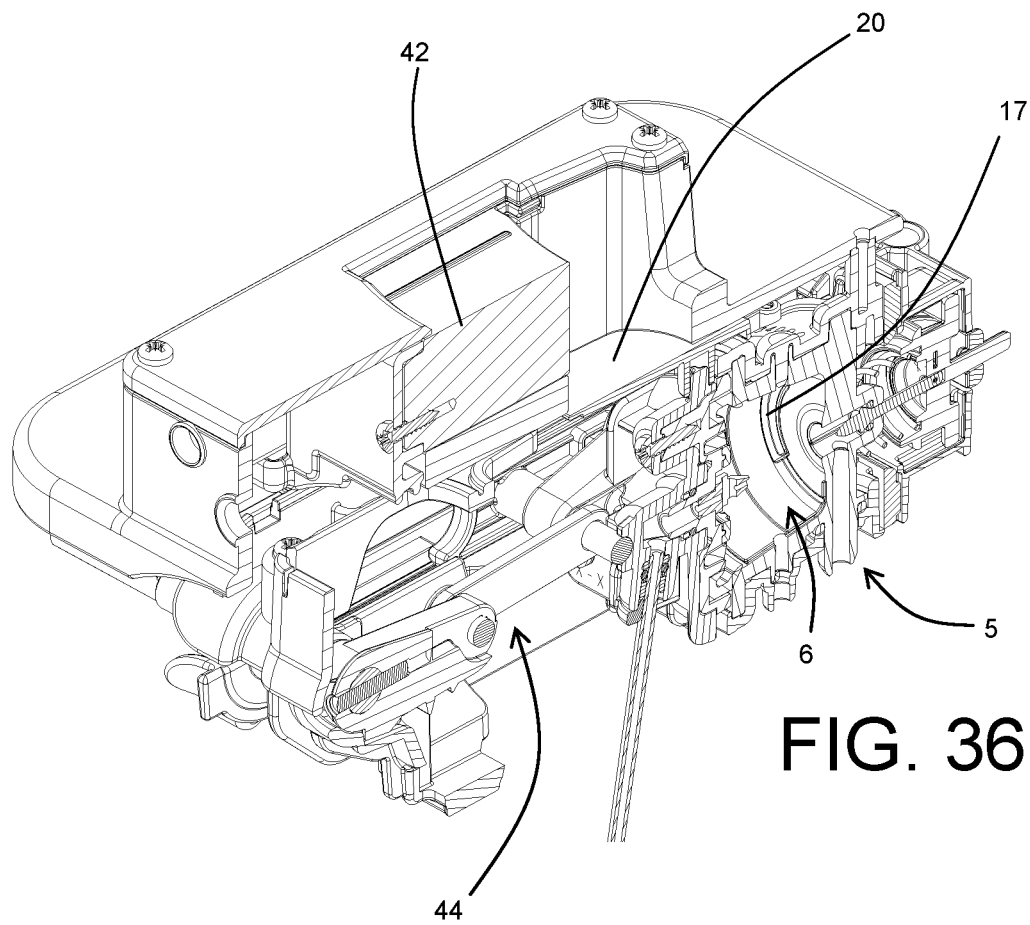
Figure 37:
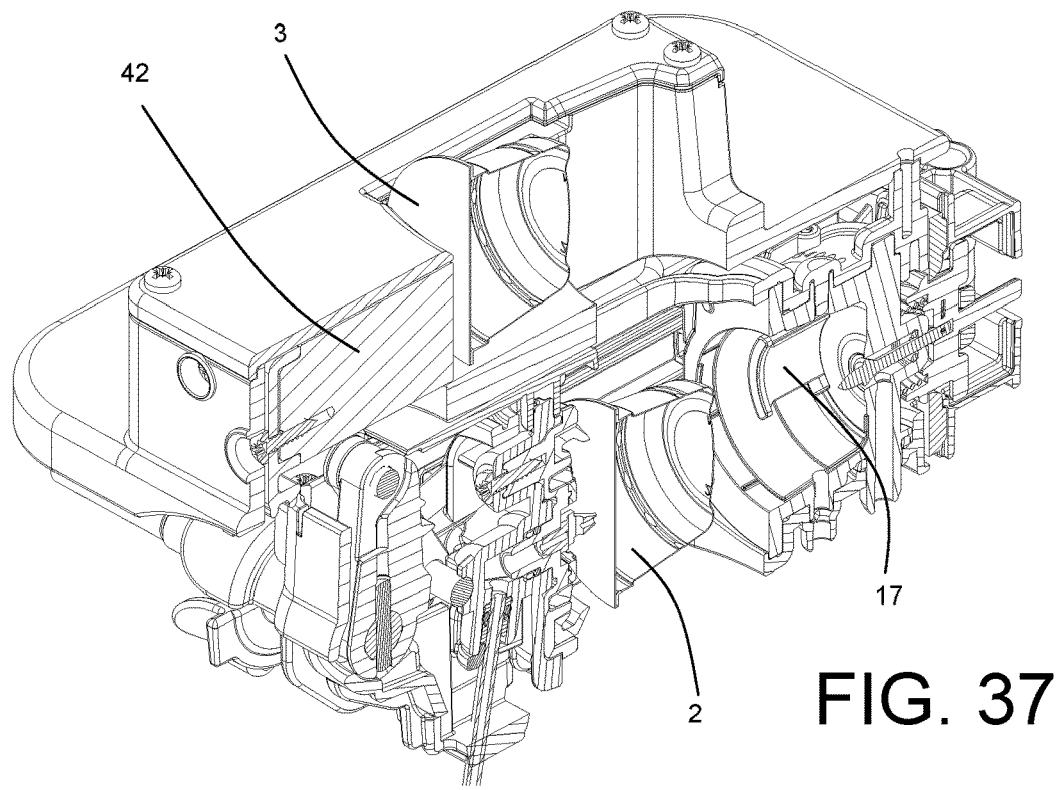
Figure 38:
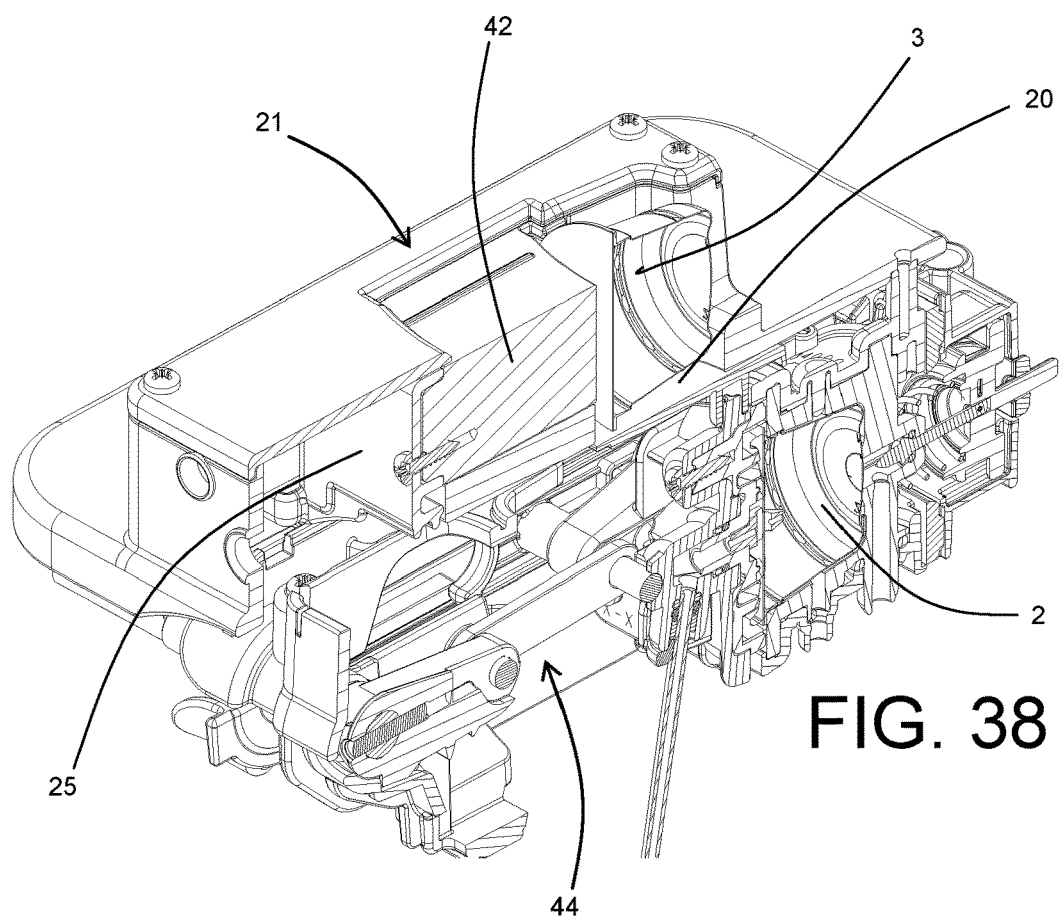
Figure 39:
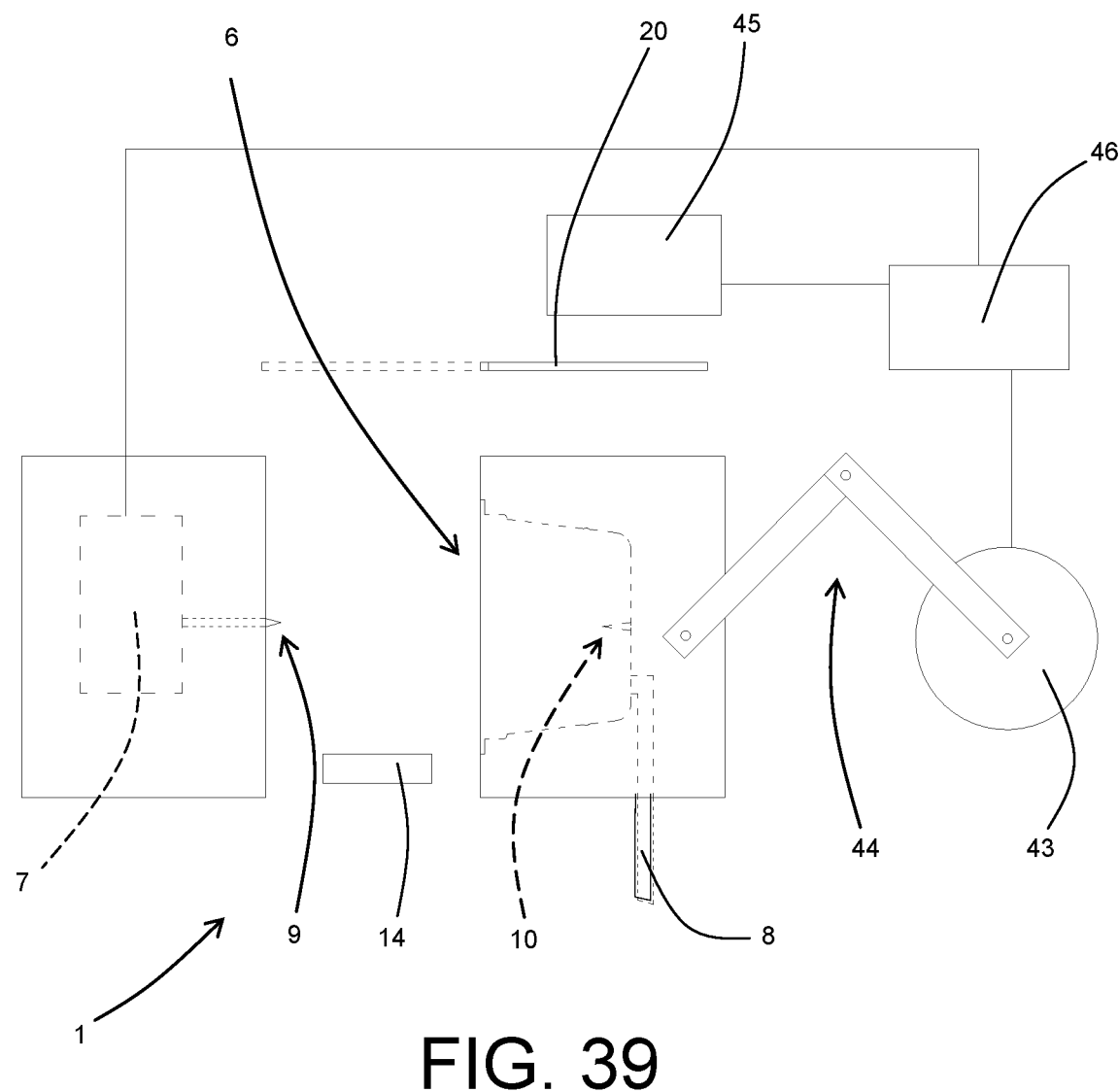

FIGS. 23 and 24 jointly show, in an exploded view, two fixed parts of a detail of the part of the apparatus of the preceding figures FIG. 25a shows a slide that is part of the apparatus of FIG. 1, equipped with two vertical supporting arms that in use are positioned between the two fixed parts of FIGS. 23 and 24;

FIG. 25b shows the slide of FIG. 25a from a different viewpoint;

FIG. 26 shows the part of FIG. 24 in section according to the line VI-VI of FIG. 2;

FIG. 27 is an enlarged view of the detail XXVII of FIG. 25b;

FIG. 28 is a section in a plane corresponding to the line IV-IV of FIG. 3, of a second embodiment of the main part of the apparatus according to this invention, which constitutes a variant of the first embodiment;

FIG. 29 is an axonometric view of a third embodiment of a main part of an apparatus made in accordance with this invention, in a first operating configuration;

FIG. 30 is a top view with the other parts cut away for clarity, of a detail of the main part of the apparatus of FIG. 29;

FIG. 31 is an axonometric view of the main part of the apparatus of FIG. 29 in a second operating configuration;

FIG. 32 is a top view with the other parts cut away for clarity, of a detail of the main part of the apparatus of FIG. 31;

FIG. 33 is an axonometric view of a fourth embodiment of a main part of an apparatus made in accordance with this invention, in a first operating configuration;

FIG. 34 is an axonometric view of the main part of the apparatus illustrated in FIG. 33, longitudinally sectioned in a plane similar to that indicated in FIG. 5 for the first embodiment;

FIG. 35 is an enlarged view of the detail XXXV of FIG. 34;

FIG. 36 is an axonometric section view of the main part of the apparatus of FIG. 34 in a second operating configuration;

FIGS. 37 and 38 show two steps of use of the main part of the apparatus of FIGS. 34 and 36 for supplying two beverages one after the other; and FIG. 39 is a schematic illustration of the structure of other parts of an apparatus made in accordance with this invention, usable with all of the embodiments.

With reference to the above-mentioned figures, the numeral 1 denotes in its entirety an apparatus for making beverages by passing hot water in a capsule 2, 3 containing a food substance, made according to this invention.

The accompanying figures show four different embodiments of an apparatus 1 made in accordance with this invention, which differ in terms of the system for loading the capsules.

As regards the aspects shared by all of the embodiments, the apparatuses 1 made in accordance with this invention comprise a supporting structure 4 on which, first an extraction unit 5 is mounted, advantageously of the horizontal type. This forms an openable extraction chamber 6 in which, in use, it is possible to insert a capsule 2, 3 to be used for making the beverage. Connected with the extraction chamber 6 there are means for making a beverage designed, in use, for making hot water circulate through a capsule 2, 3 contained in the closed extraction chamber 6, thereby causing the beverage to be formed, and for supplying the beverage formed in that way to the outside of the apparatus 1. In the known way, the means for making the beverage comprise both a feeding circuit 7 for feeding hot water, which is more or less pressurised, to the extraction chamber 6, and a supplying duct 8 for supplying the beverage made to the outside. If necessary, they may also comprise first piercing means 9 for making a first hole in the capsule 2, 3 through which to feed the water into the capsule 2, 3, and second piercing means 10 for making a second hole through which to allow the beverage to come out of the capsule 2, 3. In any case, since the means for making the beverage are not part of the innovative aspects of this invention and are in themselves similar to the prior art ones, they will not be described in further detail herein. However, it should be noticed that FIGS. 1 to 5, 28, 29 and 31 show the entire feeding duct 11 for feeding water to the extraction chamber 6, whilst the illustration of that duct 11 is interrupted in all of the other figures that show it.

In the known way, the extraction unit 5 in turn comprises a first part 12 and a second part 13, which are movable, at least one relative to the other, between a home position in which the extraction chamber 6 is open, and an extraction position in which the extraction chamber 6 is closed. When they are in the home position, the first part 12 and the second part 13 of the extraction unit 5 are far enough apart to allow a capsule 2, 3 to be positioned between them. In contrast, when they are in the extraction position, they are coupled together so that in use they clamp a capsule 2, 3 in the extraction chamber 6.

As already indicated, advantageously, the extraction unit 5 is of the horizontal type. Therefore, the first part 12 and the second part 13 are movable one relative to the other with a horizontal line of movement parallel to a central axis defined by the extraction chamber 6. Moreover, the extraction chamber 6 is advantageously made substantially entirely in one of either the first part 12 or the second part 13 (it is in the second part 13 in the accompanying figures), whilst the other part (the first part 12 in the accompanying figures) acts only as a lid for the chamber.

As already indicated, when the first part 12 and the second part 13 are in the home position, they are far enough apart to allow a capsule 2, 3 to be positioned between them. Advantageously the capsule is positioned with its central axis substantially horizontal and parallel to or coinciding with the central axis of the extraction chamber 6. To keep a capsule 2, 3 in the standby position, in which it is positioned between the first part 12 and the second part 13 when these are in the home position, the apparatus 1, in the known way, comprises retaining means 14 for the capsule 2, 3. Said retaining means 14 are able to retain the capsule 2, 3 in the standby position both when the first part 12 and the second part 13 are in the home position and during at least part of their shifting from the home position to the extraction position (usually at least until the capsule 2, 3 is inserted in the extraction chamber 6 enough so that it can no longer fall).

The structure of the retaining means 14 may vary, depending on requirements (such as those described in patents EP 1 721 553 B1 and EP 1 757 212 B1). In the embodiments illustrated in the accompanying figures, they comprise in particular two blocks 15 slidably mounted on the first part 12 in such a way that they can move outwards. Each block 15 is equipped with a vertical groove (closed at the bottom) facing the other block 15 and in which, in use, the projecting flange 16 of the capsule 2, 3 is inserted. The blocks 15 can also be spread apart after the shifting of the first part 12 and of the second part 13 towards the extraction position, to release the capsule 2, 3 into the extraction chamber 6.

However, since these are known solutions, they will not be described in further detail herein.

Advantageously, the apparatus 1 comprises capsule 2, 3 ejecting means 17 that cause the capsule 2, 3 to be ejected from the extraction chamber 6 at the end of beverage supplying, as the first part 12 and the second part 13 return to the home position. The ejecting means 17 may either be constituted of the retaining means 14, or they may be independent of the latter (as in the embodiments illustrated). Whatever the case, they are of the known type and, therefore, are not described in further detail herein.

Figure 22:
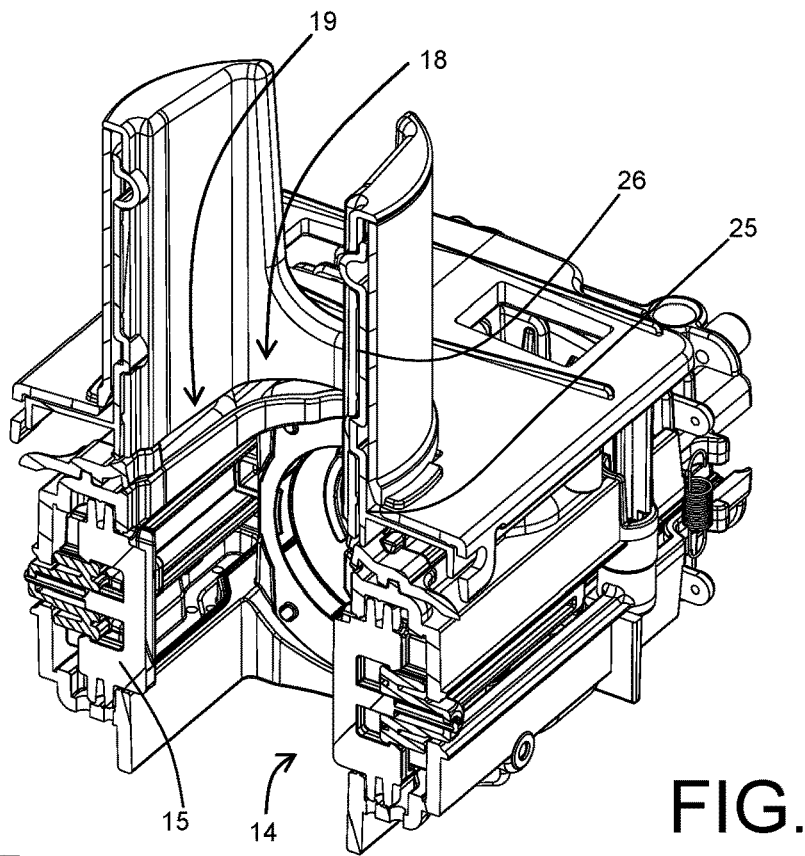
FIG. 22 is an axonometric view of the apparatus in section as in FIG. 11, in a final operating step after discharging a second capsule.

The apparatus 1 also comprises an insertion duct 18, clearly visible in FIG. 22, comprising at least one vertical main component (the duct is preferably vertical) extending from an infeed section 19 to the retaining means 14. The insertion duct 18 forms the end stretch of a path for inserting capsules in the apparatus 1 that starts upstream of the infeed section 19, and whose part upstream of the insertion duct 18 is one of the main subjects of this invention, as described in more detail below.

A closing element 20 is positioned at the infeed section 19 and is movable between a closed position, in which it prevents the transit of a capsule 2, 3 through the infeed section 19, and a disengaged position, in which it allows the transit of a capsule 2, 3. The closing element 20 is operatively connected to the extraction unit 5 in such a way that the movements of the closing element 20 are coordinated with those of the first part 12 and the second part 13. In that way, the closing element 20 is positioned in the closed position when the first part 12 and the second part 13 are in the extraction position, and in the disengaged position when the first 12 and the second part 13 are in the home position;

In the embodiments illustrated, in which only the first part 12 is movable, the closing element 20 is substantially constituted of a rigid element that forms a kind of partition at the infeed section 19 and that is rigidly fixed to the first part 12 so that it moves in a way synchronised with it.

The means for making the beverage, the extraction unit 5, the closing element 20, the retaining means 14 and the ejecting means 17 adopted in the embodiments illustrated in the accompanying figures substantially correspond to what is described in patent applications WO 2015/019248 A1 and WO 2015/019249 A1 by this Applicant, to which reference should be made for further details and whose content is incorporated herein by reference to it.

According to a first innovative aspect of this invention, the apparatus 1 also comprises at least one first supporting element 21 that is positioned along the insertion path upstream of the infeed section 19, and whose function is to support a second capsule 3 outside the extraction unit 5 while a first capsule 2 is positioned at the extraction chamber 6. The first supporting element 21 is switchable between an active configuration in which it can support a capsule 2, 3 and an inactive configuration in which a capsule 2, 3 positioned at it can freely advance towards the infeed section 19. Moreover, the first supporting element 21 is operatively connected to the extraction unit 5 or to the closing element 20 at least so that the first supporting element is in the inactive configuration when the first part 12 and the second part 13 are in the extraction position. According to a further innovative aspect of this invention, during the shifting of the first part 12 and of the second part 13 from the home position to the extraction position, and the shifting of the closing element 20 from the disengaged position to the closed position, one of either the first part 12 or the second part 13 (advantageously the movable part), or the closing element 20, acts on the first supporting element 21 to switch it from the active configuration to the inactive configuration. Advantageously, the action of the closing element 20 or of one of either the first part 12 or the second part 13, on the first supporting element 21, is exclusively mechanical. In the embodiments illustrated, in particular, that is achieved by contact of a rigid body 22 fixed to the closing element 20 and rigidly fixed to second part 13, against one or more projections that are fixed to the first supporting element 21.

The various embodiments illustrated in the accompanying figures will now be described, highlighting the aspects that they share and those which cause them to differ. Hereinafter, when reference is made to the first embodiment, it will mean that of FIGS. 1 to 27, references to the second embodiment will mean that of FIG. 28, references to the third embodiment will mean that of FIGS. 29 to 32 and references to the fourth embodiment will mean that of FIGS. 33 to 38.

In all of the embodiments illustrated, at least for one stretch upstream of the infeed section 19, the insertion path advantageously comprises two opposite channels 23 in which in use the projecting flange 16 of the capsule 2, 3 can slide.

In the first three embodiments illustrated in the accompanying figures, at least at one of the channels 23, the first supporting element 21 comprises at least one first tooth 24 which in the active configuration is positioned inside the self-same channel 23 for in use preventing the transit of the flange 16 of the capsule 2, 3 and which in the inactive configuration is positioned outside the channel 23. However, advantageously, the first supporting element 21 comprises two opposite first teeth 24, each positioned at one of the channels 23.

Figure 19:
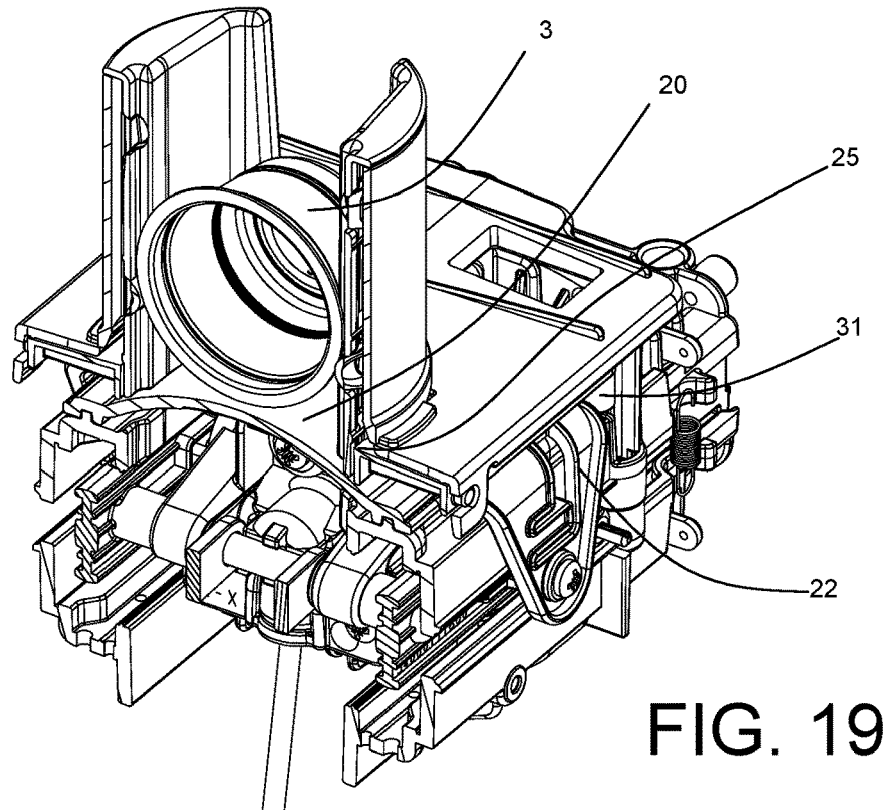
FIG. 19 shows the apparatus in the operating step of FIG. 18, in section as in FIG. 11.
Figure 20:
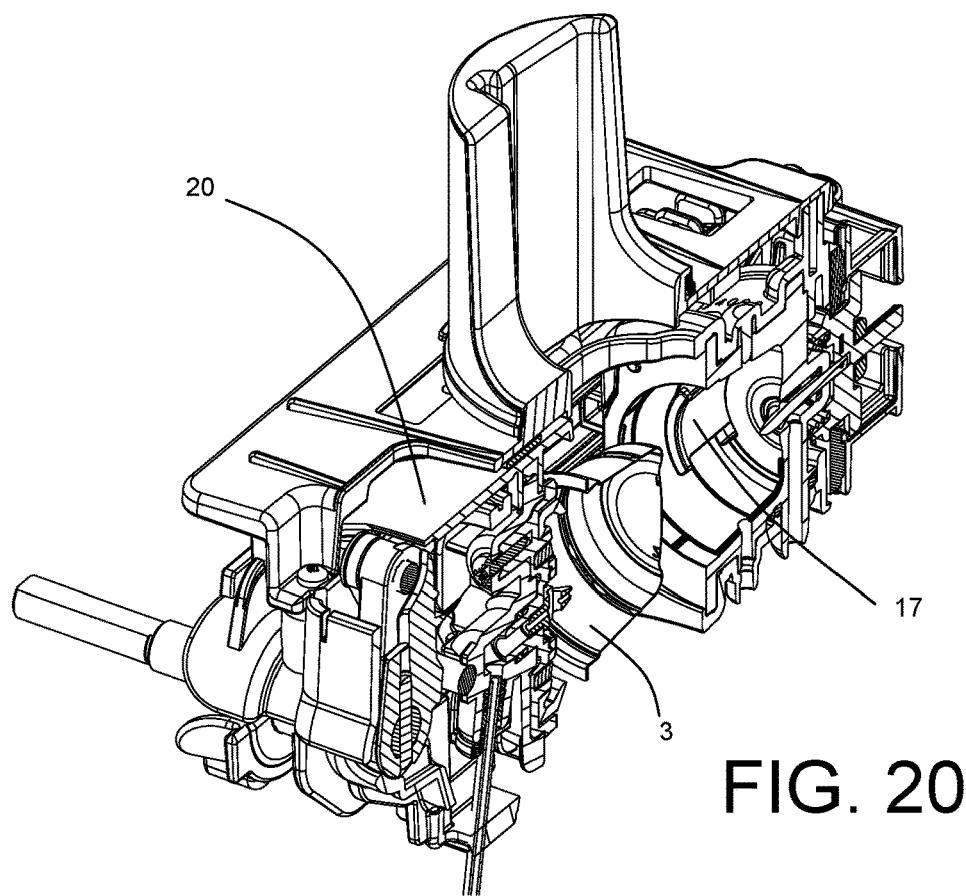
FIG. 20 is an axonometric view of the apparatus of FIG. 10 in a fourth operating step.
Figure 21:
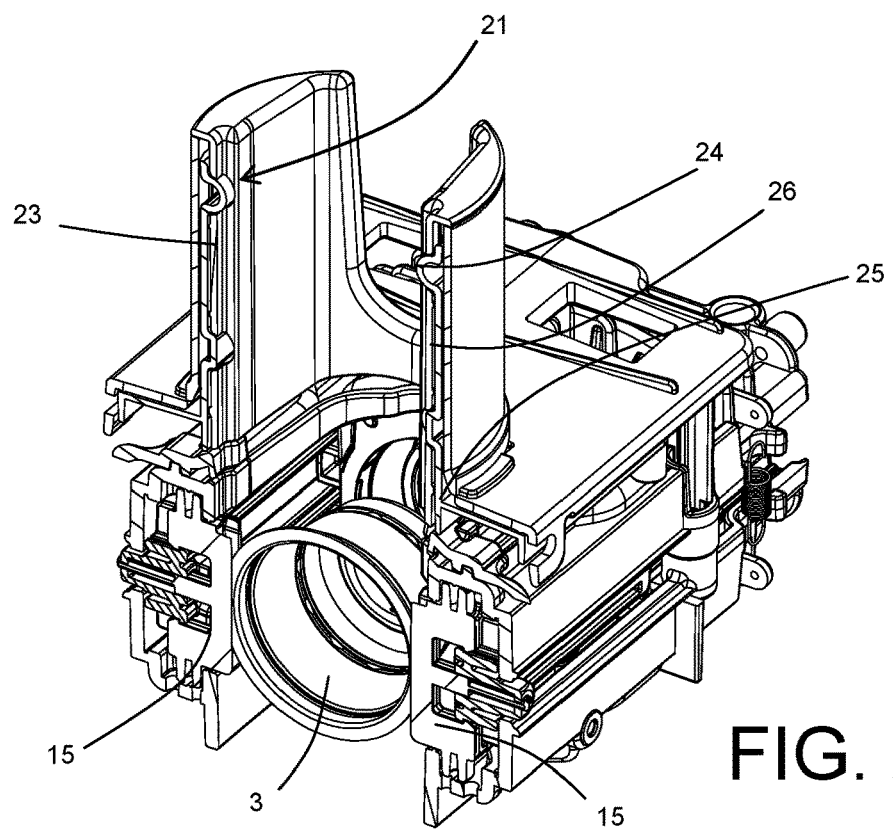
FIG. 21 shows the apparatus in the operating step of FIG. 20, in section as in FIG. 11.

In all of the first three embodiments illustrated, the first supporting element 21 is movable, and the different configurations that it can adopt correspond to its different positions. In particular, it is switchable between the active configuration and the inactive configuration by means of a shifting of it, and in the active configuration the first supporting element 21 is positioned in an active position in which it intercepts the advancing path (FIG. 17) and in the inactive configuration it is positioned in an inactive position in which it does not interfere with the insertion path (FIG. 19). In particular, that is advantageously achieved thanks to the fact that the first supporting element 21 is mounted on a slide 25 translatable orthogonally to the line of extension of the insertion path, that is to say, horizontally in the accompanying figures, and parallel to the line of movement of the first part 12 and the second part 13.

As regards the first embodiment illustrated, as shown in FIGS. 23 to 27, the two first teeth 24 are mounted at a top end of corresponding vertical supporting arms 26, extending from the slide 25 and inserted between two fixed parts, an inner body 27 forming the channels 23 and the insertion path for the capsule 2, 3, and an outer containment body 28. In particular, the two first teeth 24 are positioned at two first slits 29 made in the inner body 27 at the channels 23, and the movement of the slide 25 causes shifting of the first teeth 24, through the first slits 29, between the position in which they are positioned in the channel 23 and the position in which they are positioned outside the channel 23. More precisely, in the embodiment illustrated in FIGS. 23 to 25b, the shifting of the slide 25 towards the left (observing the slide 25 from the side in the foreground in FIGS. 25a and 25b) brings the first teeth 24 into the channel 23 (therefore into the active configuration), whilst the opposite shifting, towards the right, brings the first teeth 24 out of the channel 23 (therefore into the inactive configuration).

As shown, the slide 25 comprises four lower projections, two front projections 30 and two rear projections 31 (front and rear relative to the definitions given with reference to the apparatus 1 as a whole), designed to interact in contact against the closing element 20 to cause shifting of the slide 25 following shifting of the closing element 20. With reference to FIGS. 25a and 25b, the front projections 30 are used to bring the first supporting element 21 into the active configuration, whilst the rear projections 31 are used to bring the first supporting element 21 into the inactive configuration.

In fact, according to a preferred solution implemented in both the first and second embodiments, during the shifting of the first part 12 and of the second part 13 from the extraction position to the home position, and of the closing element 20 from the closed position to the disengaged position, one of either the first part 12 or the second part 13, or the closing element 20 mechanically acts on the first supporting element 21 to switch it from the inactive configuration to the active configuration, and the first supporting element 21 is in the active configuration when the first part 12 and the second part 13 are in the home position. In the first two embodiments this is achieved thanks to the interaction of the closing element 20 with the front projections 30.

It should be noticed that the rear projections 31 and the front projections are at a distance from each other and interact with the closing element 20 not for the entire shifting of the latter, but only during the final stretch of the respective shifting operations towards the closed position and the disengaged position. In this way, the switching of the first supporting element 21 occurs exclusively when the shifting of the closing element 20 is almost complete.

Both the inner body 27 and the outer body 28 comprise a front lowered portion 32 and a rear lowered portion 33, allowing an operator to easily insert and remove capsules 2, 3 in/from the insertion path, whilst the inner body 27 also comprises two elongate horizontal through holes 34, through which the two vertical supporting arms 26 extend.

The first embodiment differs from the second embodiment practically solely due to the fact that the first embodiment implements a further preferred solution of this invention, in which in general the apparatus 1 also comprises at least one second supporting element 35 for supporting a capsule 2, 3 outside the extraction unit 5, when the first part 12 and the second part 13 are in the extraction position. That second supporting element 35 is also positioned along the insertion path, upstream of the infeed section 19 and downstream of the first supporting element 21. Moreover, it is switchable between an operating configuration, in which it can support a capsule 2, 3, and a non-operating configuration in which a capsule 2, 3 positioned at it can freely advance towards the infeed section 19. During the shifting of the first part 12 and of the second part 13 respectively from the home position to the extraction position and vice versa, and during the shifting of the closing element 20 respectively from the disengaged position to the closed position and vice versa, one of either the first part 12 or the second part 13, or the closing element 20, mechanically acts on the second supporting element 35 to switch it respectively from the non-operating configuration to the operating configuration and vice versa. In this way, the second supporting element 35 is in the operating configuration when the first part 12 and the second part 13 are in the extraction position, and is in the non-operating configuration when the first part 12 and the second part 13 are in the home position.

Similarly to the first supporting element 21, the second supporting element 35 is also movable, and is advantageously switchable between the operating configuration and the non-operating configuration by means of shifting of it. When it is in the operating configuration, the second supporting element 35 is positioned in an operating position in which it intercepts the advancing path, whilst in the non-operating configuration it is positioned in a non-operating position in which it does not interfere with the insertion path.

The second supporting element 35 therefore acts similarly to the first supporting element 21 but substantially in "phase opposition".

In the preferred embodiment, at least at one of the channels 23 the second supporting element 35 comprises at least one second tooth 36 which in the operating configuration is positioned inside the self-same channel 23 for in use preventing the transit of the flange 16 of the capsule 2, 3 and which in the non-operating configuration is positioned outside the channel 23. However, advantageously, like the first supporting element 21, the second supporting element 35 also comprises two opposite second teeth 36, each positioned at one of the channels 23.

The second supporting element 35 is also advantageously mounted on the above-mentioned slide 25. In particular, in the embodiment illustrated (FIGS. 23 to 27), the second teeth 36 are also mounted on the vertical supporting arms 26, at an intermediate portion of them, and are positioned at two second slits 37 made in the inner body 27 at the channels 23. The shifting of the slide 25 of FIGS. 25a and 25b towards the left brings the second teeth 36 out of the channel 23 (therefore into the non-operating configuration), whilst the opposite shifting, towards the right, brings the second teeth 36 into the channel 23 (therefore into the operating configuration). That is achieved thanks to the fact that, vertically, the second teeth 36 are out of alignment with the first teeth 24.

As regards the second embodiment illustrated in FIG. 28, as already indicated, it is substantially identical to the first embodiment, expect for the fact that it does not comprise the presence of the second supporting element 35. Therefore, in use, a capsule 2, 3 that in the first embodiment would be supported by the second supporting element 35, in the second embodiment rests directly on the closing element 20.

In the first two embodiments, the first supporting element 21 is also positioned at a distance from the infeed section 19 that, with the closing element 20 in the closed position, allows the insertion of two capsules 2, 3 in the insertion path, in such a way that the first supporting element 21 is located in an intermediate position relative to the positions of the parts of the flanges 16 of the capsules 2, 3 inserted in the channels 23. As is also described in more detail below, in particular, upon insertion, the first capsule 2 inserted rests respectively on the second supporting element 21 (in the first embodiment) or on the closing element 20 (in the second embodiment) and the second capsule 3 inserted rests on the first capsule 2, and the part of its flange 16 that is inserted in the channel 23 is at a height (distance from the infeed section 19) greater than that at which the first supporting element 21 is located in the inactive configuration. In this way, following switching of the first supporting element 21 to the active position and the shifting of the closing element 20 to the disengaged position, the first capsule 2 inserted can reach the standby position, whilst the second capsule 3 inserted can advance until its flange 16 rests on the first supporting element 21.

In contrast, as regards the third embodiment, again the switching of the first supporting element 21 occurs by means of its shifting. But there are significant differences compared with what is described above relative to the first two embodiments.

In fact, in the third embodiment, firstly the first supporting element 21 is manually shiftable from the inactive position to the active position, when the first part 12 and the second part 13 are in the home position. For that purpose, the first supporting element 21 comprises grip flange 47 accessible to the user, whilst it is free of parts that may mechanically interact with the first part 12, the second part 13 or the closing element 20 during opening of the extraction chamber 6. In particular, also in the third embodiment illustrated in the accompanying figures, the first supporting element 21 is fixed to a slide 25 that can translate horizontally but which, unlike that of the first two embodiments, comprises only the rear projections 31 (which allow it to automatically shift into the inactive position), not the front projections.

Furthermore, in the third embodiment the two capsules 2, 3 are inserted with the extraction chamber 6 open, so that the first capsule 2 inserted (with the first supporting element 21 in the inactive configuration) directly reaches the standby position, whilst the second capsule 3 is positioned after having switched the first supporting element 21 to the active configuration, and remains resting on the self-same first supporting element 21. For that purpose, the first supporting element 21 also comprises a supporting shelf 38 movable, synchronised with the first teeth 24, between its own retracted position (FIG. 30) in which it does not interfere with the insertion path and allows capsule 2, 3 transit, and a projecting position (FIG. 32) in which it interferes with the insertion path to prevent capsule 2, 3 transit (in the accompanying figures the supporting shelf 38 is designed to interact with the bottom of the capsule 2, 3).

Finally, the fourth embodiment implements a solution in which more generally the first supporting element 21 comprises a supporting body 39 for the capsule 2, 3, having a transit opening 40, and a seat 41 for the capsule 2, 3 positioned alongside the transit opening 40. The transit opening 40 for the capsule 2, 3 is vertically aligned with the infeed section 19 and is designed to allow the capsule 2, 3 to advance towards the infeed section 19. In contrast, a second capsule 3 may be positioned on the seat 41, whilst a first capsule 2 may be inserted in the standby position through the transit opening 40 and the infeed section 19 (obviously with the closing element 20 in the disengaged position).

The first supporting element 21 also comprises a thrust element 42 movable between a back position in which it allows the positioning of a capsule 2, 3 on the seat 41, and a forward position. The shifting of the thrust element 42 from the back position to the forward position in use causes the shifting of a capsule 2, 3 positioned on the seat 41, from the self-same seat 41 to the transit opening 40. When the thrust element 42 is in the back position, the first supporting element 21 is in the active configuration, since it is able to support a capsule 2, 3, whilst when the thrust element 42 is in the forward position, the first supporting element 21 is in the inactive configuration, since it is unable to support a capsule 2, 3.

In other words, according to the fourth embodiment, after a first capsule 2 has been inserted directly in the standby position, insertion of the second capsule 3 involves simply resting it on the seat 41 disengaged from the thrust element 42. Only after the extraction chamber 6 has been closed, is the second capsule 3 automatically shifted to the transit opening 40 by the apparatus 1, and then falls towards the infeed section 19.

The shifting of the thrust element 42 from the back position to the forward position (that is to say, to the inactive configuration) may also advantageously be achieved by fixing the thrust element 42 to a horizontally movable slide 25 equipped with projections (the rear projections 31) similar to that of the other embodiments. The opposite shifting, depending on requirements, may be achieved either manually (similarly to the third embodiment) or in an automated way (similarly to the first and second embodiments, also comprising the front projections 30 on the slide 25).

In any case, the fourth embodiment differs from the preceding embodiments described, in which the first supporting element 21 was entirely movable, because in the fourth embodiment only part of the first supporting element 21 (the thrust element 42) is movable, so that the switching between the active configuration and the inactive configuration is achieved by modifying the position of the seat 41 and the thrust element 42 relative to one another.

As can be inferred by comparing the different embodiments described above, if movement of the first supporting element 21 (entire or partial) is fully automatic, the apparatus 1 will always perform it irrespective of whether or not two capsules 2, 3 have been loaded. In contrast, if the first supporting element 21 is moved to the active configuration exclusively manually, the apparatus 1 will move the first supporting element 21 to switch it to the inactive configuration exclusively if it was previously switched to the active configuration manually (which in principle should only occur if two capsules 2, 3 are loaded); in all other cases the first supporting element 21 will remain in the inactive configuration.

As already indicated, this invention may be used both in apparatuses 1 able to automatically make a single beverage each time, and in apparatuses 1 able to automatically make two beverages, one after another. However, it is advantageously used for automatically making two beverages, one after another.

In this case, in addition to what is described above, the apparatus 1 (FIG. 39) also comprises first, a motor 43 operatively connected to the first part 12 and to the second part 13 for moving them between the home position and the extraction position. In the accompanying figures the motor 43 drives a crank—connecting rod mechanism 44 connected to the first part 12.

Moreover, the apparatus 1 comprises an interface 45 which a user can use to at least partly control operation of the apparatus 1. In particular, the interface 45 comprises at least one control (which may be constituted of a simple push-button or a touch-screen) for supplying two beverages one after another.

The interface 45, the motor 43 and the beverage making means are connected to an electronic control unit 46 that controls operation of the apparatus 1 depending on commands given by the user through the interface 45.

According to a further innovative aspect of this invention, as a result of the fact that the user can use the interface 45 to give the command to supply two beverages one after another, the electronic control unit 46 is programmed in use to perform a sequence of operating steps one after another.

In particular, according to an operating method applicable to all of the embodiments described above, starting from a situation in which the first part 12 and the second part 13 are in the home position, with a first capsule 2 in the standby position and a second capsule 3 resting on the first supporting element 21, the electronic control unit is programmed first to shift the first part 12 and the second part 13 into the extraction position, clamping in the supplying chamber the first capsule 2, previously retained by the retaining means 14. During that shifting, there is a corresponding shifting of the closing element 20 form the disengaged position to the closed position, and, simultaneously, a switching of the first supporting element 21 from the active configuration to the inactive configuration. In this way, the second capsule 3 previously supported by the self-same first supporting element 21 is free to (in the first three embodiments), or obliged to (in the fourth embodiment) advance along the insertion path towards the infeed section 19. Depending on the embodiments, that advancing will allow the capsule 2, 3 to rest either on the second supporting element 35 (first embodiment) or on the closing element 20 (other embodiments).

At that point, the electronic control unit 46 activates the beverage making means and supplies a first beverage using the first capsule 2.

When that supplying is complete, the electronic control unit 46 activates the motor 43 to return the first part 12 and the second part 13 to the home position, the first capsule 2 consequently coming out of the extraction chamber 6, advantageously ejected by the ejection means 17, then falling out of the unit under the effect of gravity. The shifting of the first part 12 and the second part 13 relative to each other causes a corresponding shifting of the closing element 20 from the closed position to the disengaged position (as well as, only in the first embodiment, switching of the second supporting element 35 from the operating configuration to the non-operating configuration), and allows the second capsule 3 to reach the retaining means 14.

At that point, the electronic control unit 46 is programmed, first to again shift the first part 12 and the second part 13 to the extraction position, clamping the second capsule 3 in the supplying chamber (at the same time causing a new shifting of the closing element 20 from the disengaged position to the closed position), and then to supply a second beverage using the second capsule 3.

The subsequent re-opening of the extraction chamber 6 causes the ejection of the second capsule 3, so that the situation obtained is that shown in FIG. 22.

As already indicated, the programming described above involves the starting situation in which the first part 12 and the second part 13 are in the home position, a first capsule 2 is in the standby position and a second capsule 3 is resting on the first supporting element 21.

However, depending on the embodiments, that starting situation may be achieved in different ways and may even require preliminary operating steps.

Figure 10:
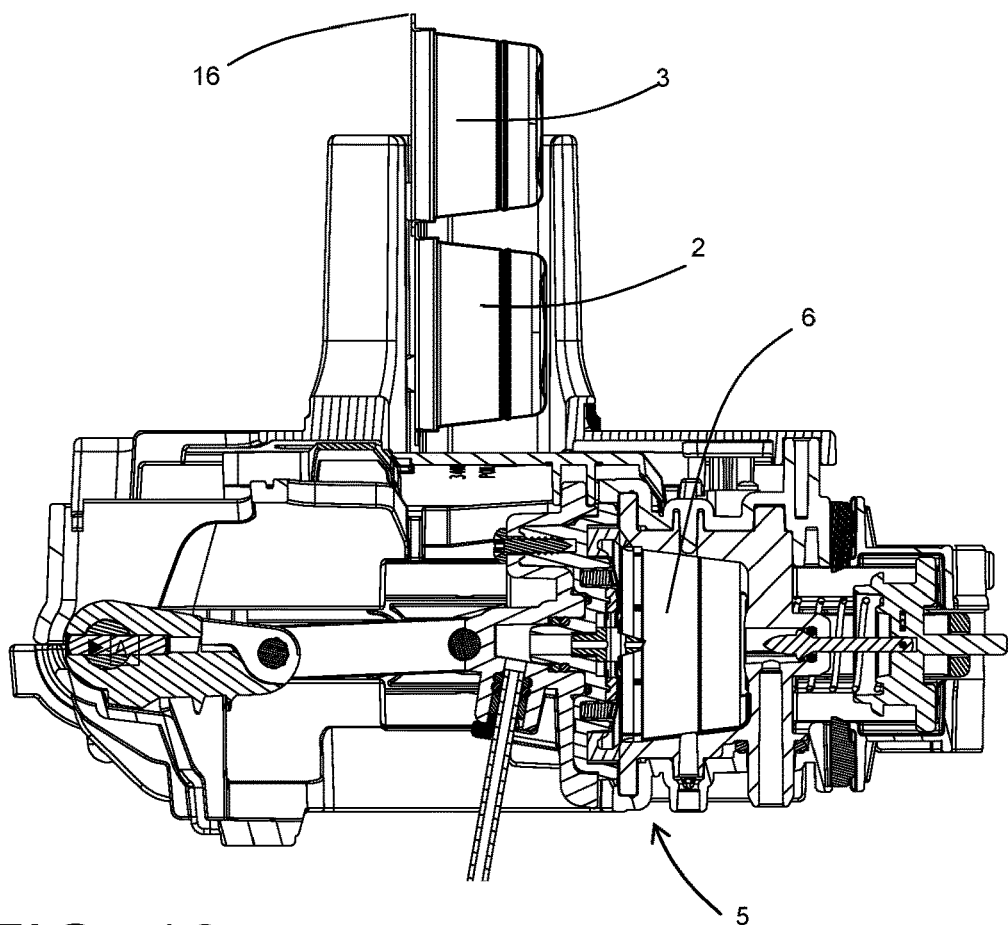
FIG. 10 shows the apparatus of FIG. 1 in section as in FIG. 4, in a first operating step for consecutive supplying of two beverages using two capsules.
Figure 11:
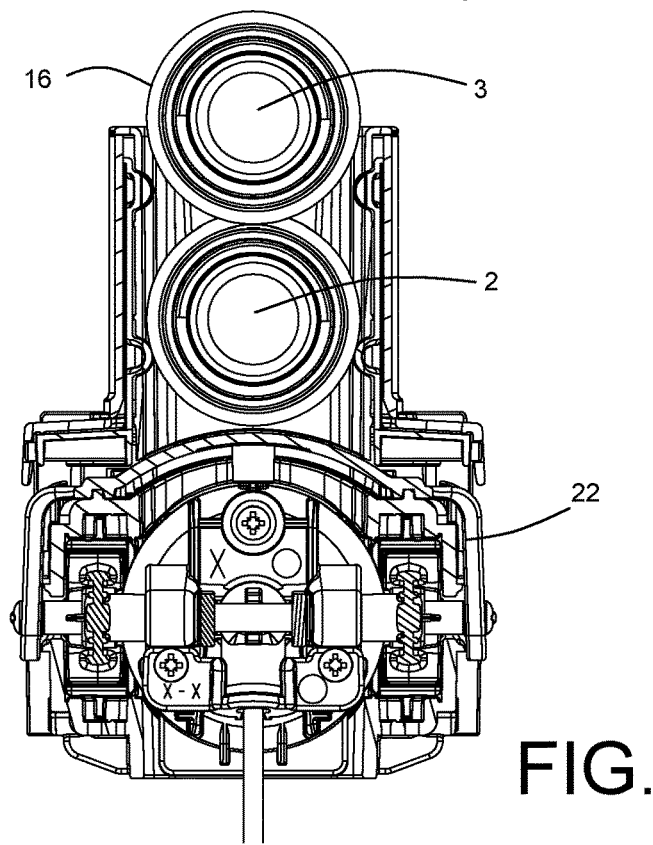
FIG. 11 shows the step of FIG. 10 with reference to the apparatus in section according to the line XI-XI of FIG. 12.
Figure 12:
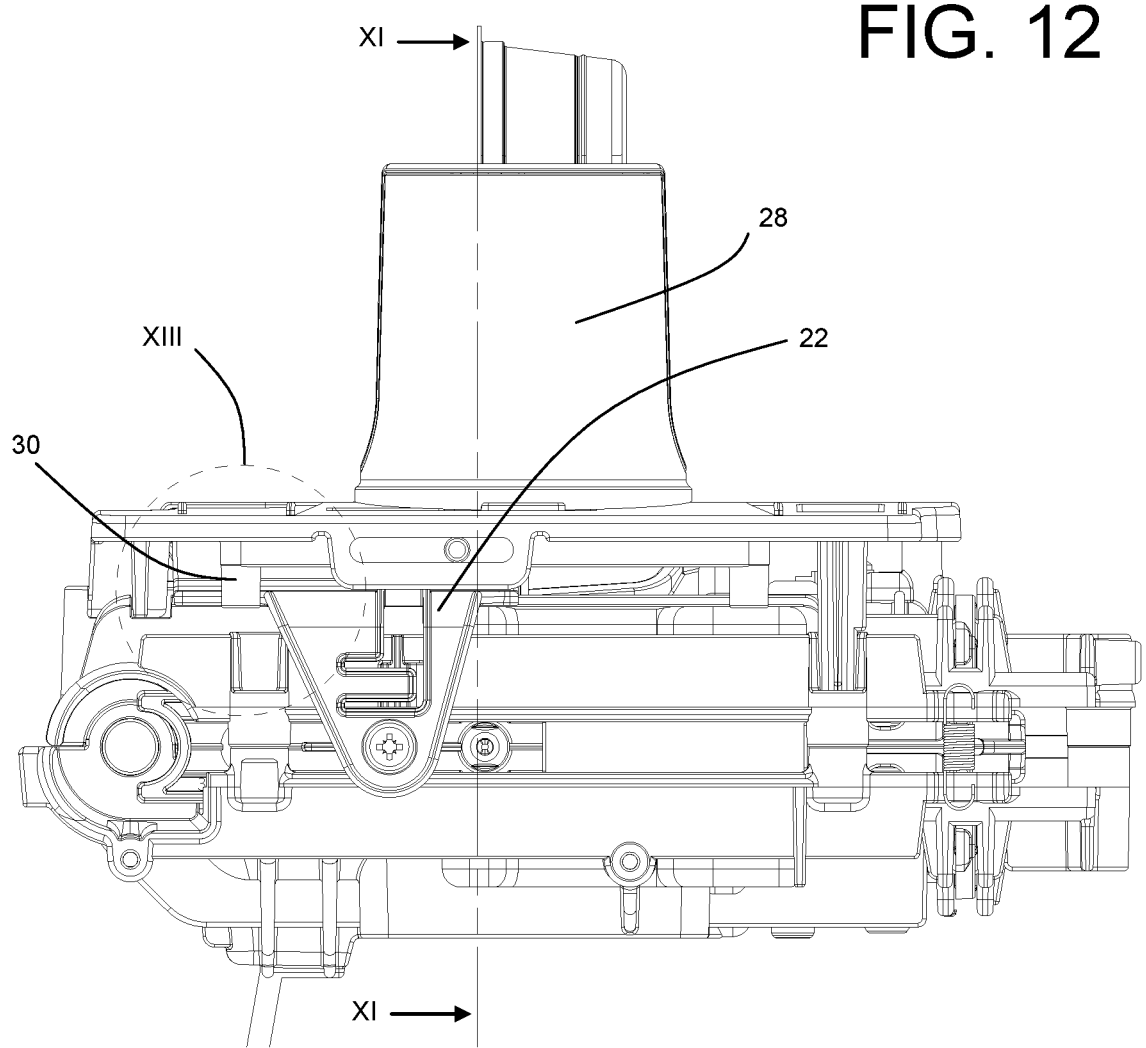
FIG. 12 shows the operating step of FIG. 10 with reference to the apparatus seen from the side.
Figure 13:
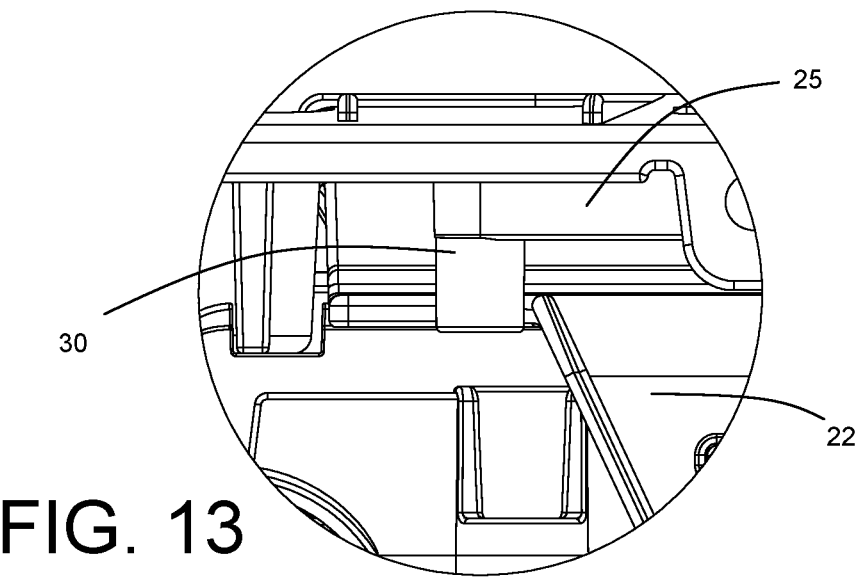
FIG. 13 is an enlarged view of the detail XIII of FIG. 12.
Figure 14:
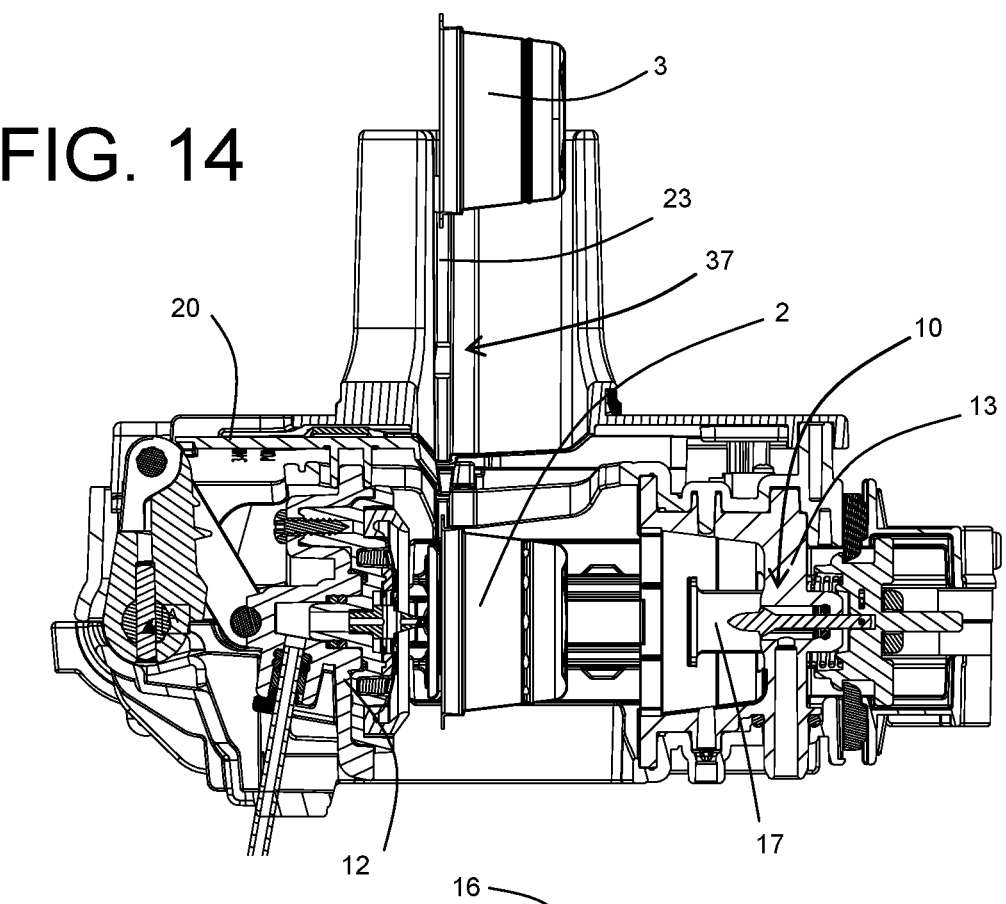
FIG. 14 shows the apparatus of FIG. 10 in a second operating step.
Figure 15:
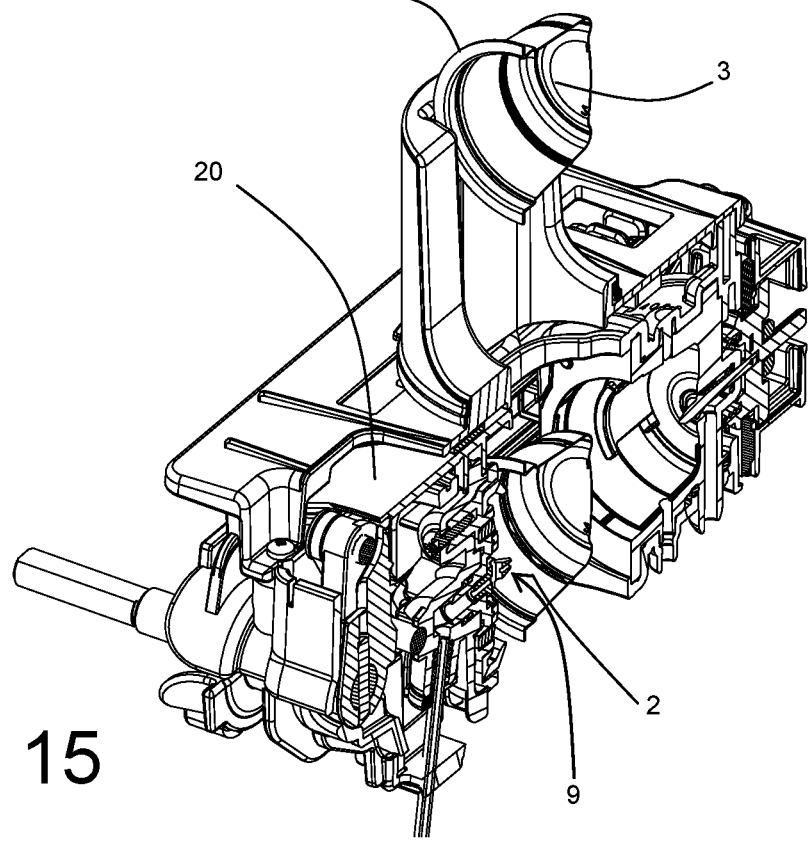
FIG. 15 is an axonometric view of the apparatus of FIG. 14.
Figure 16:
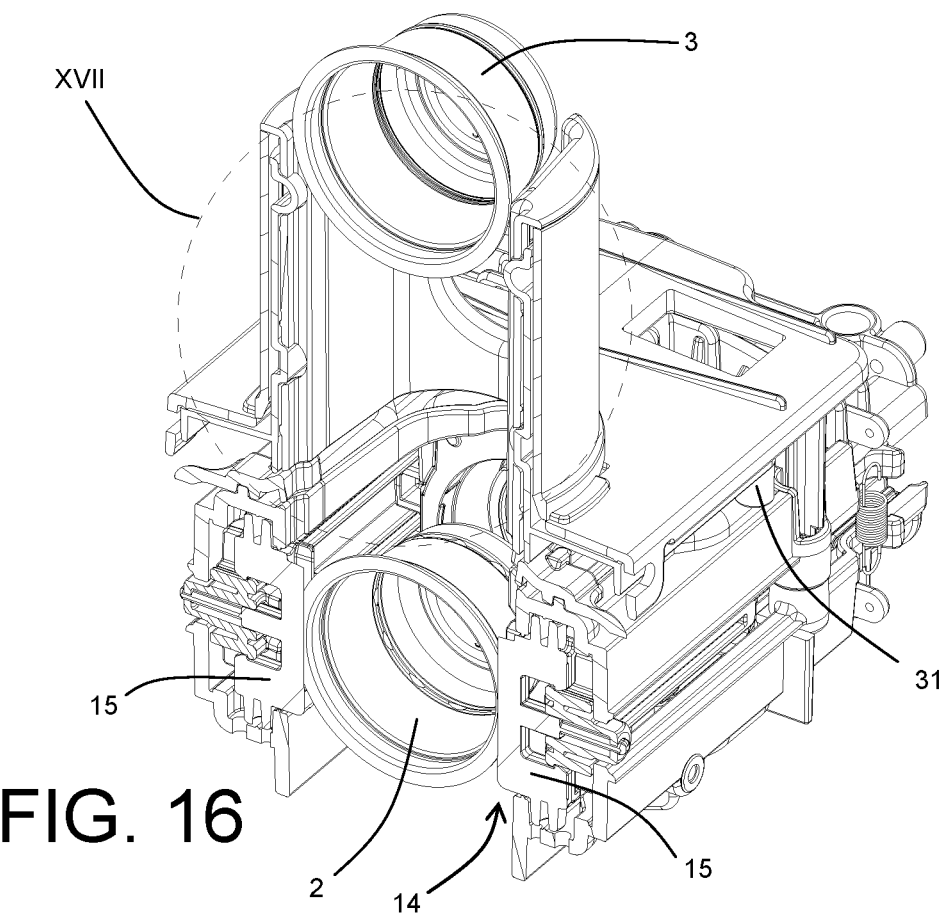
FIG. 16 is an axonometric view of the apparatus in the operating step of FIG. 14, in section as in FIG. 11.
Figure 17:
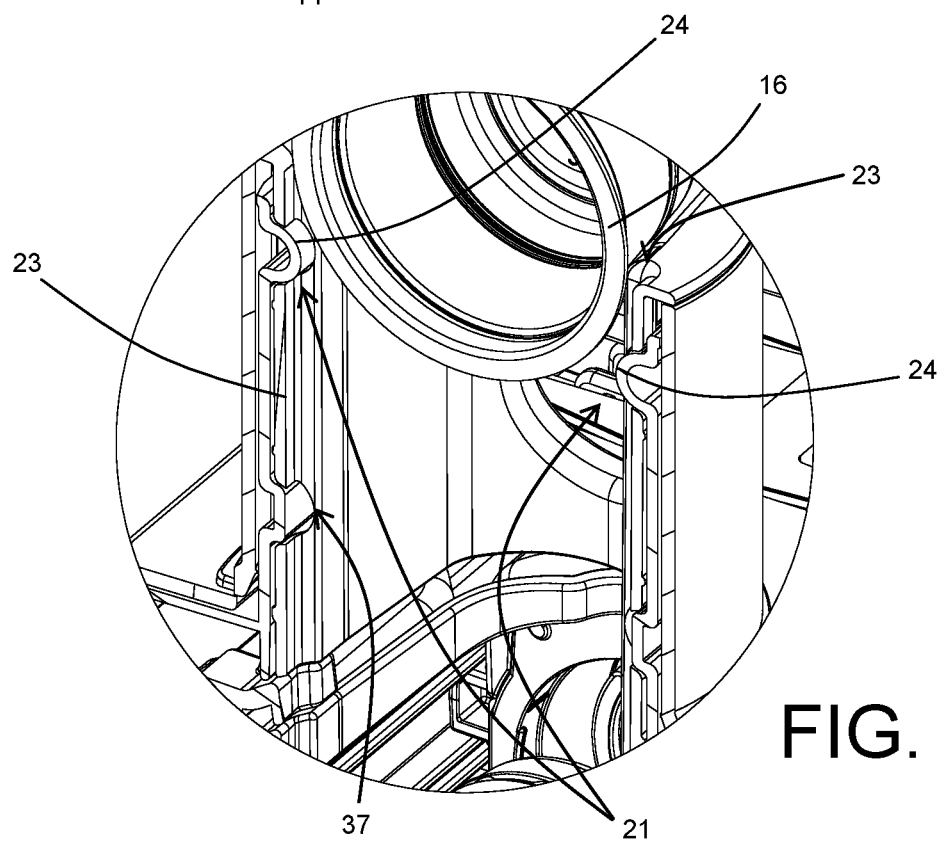
FIG. 17 is an enlarged view of the detail XVII of FIG. 16.
Figure 18:
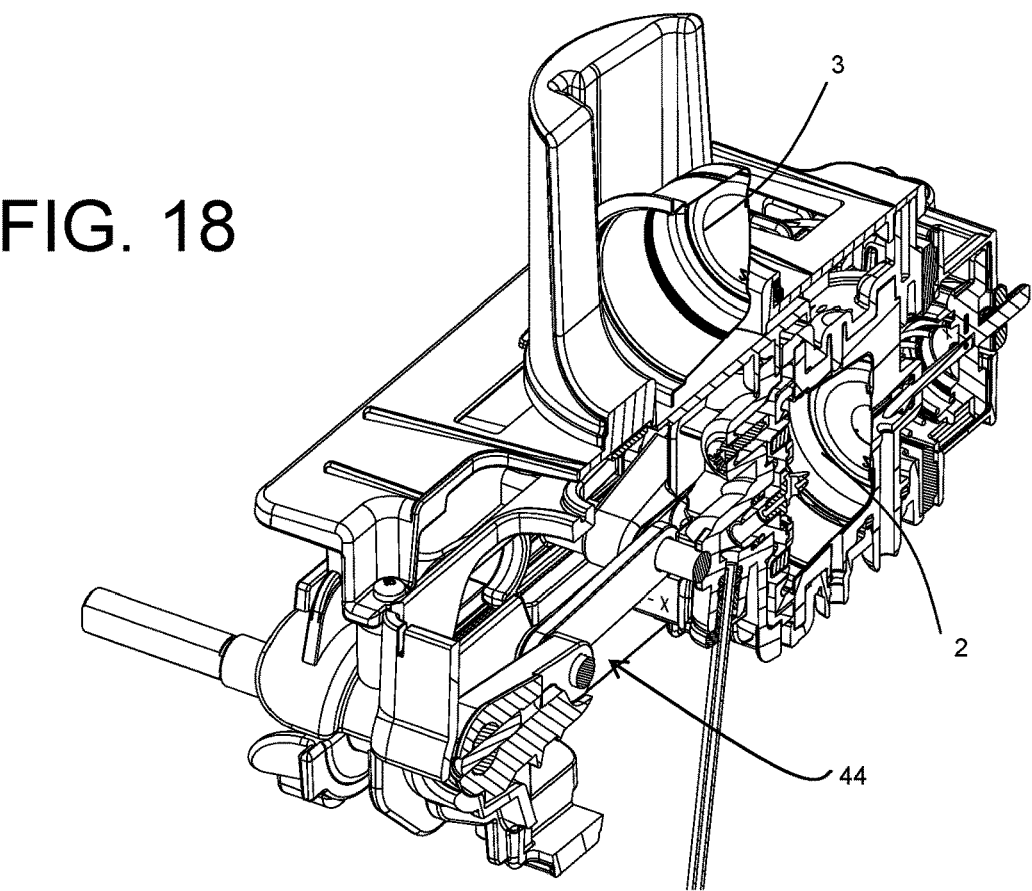
FIG. 18 is an axonometric view of the apparatus of FIG. 10 in a third operating step.

Regarding the first two embodiments, in particular, in the home position the apparatus 1 remains with the extraction chamber 6 closed. In fact, in this way, before issuing any commands, the user can insert the two capsules 2, 3: the first rests respectively on the second supporting element 35 (FIGS. 10 to 13) or on the closing element 20 (in the second embodiment); the second capsule rests on the first (FIGS. 10 to 11).

Once the user gives the double supplying command, the electronic control unit 46 is programmed to perform, before what is described above, a preliminary step of shifting the first part 12 and the second part 13 into the home position, simultaneously causing a corresponding shifting of the closing element 20 from the closed position to the disengaged position, the switching of the first supporting element 21 to the active configuration, and, only in the first embodiment, the switching of the second supporting element 35 to the non-operating configuration (FIGS. 14 to 18). After that shifting, the first capsule 2 can reach the retaining means 14 and the second capsule 3 can come to rest on the first supporting element 21.

At that point, operation continues as described above.

In contrast, regarding the third embodiment, it may be the case that, in the home position, the apparatus 1 remains with the extraction chamber 6 either closed or open.

In the former case, there are two alternative possibilities.

According to the first possibility, when the user gives the double supplying command, the electronic control unit 46 is programmed to bring the first part 12 and the second part 13 to the home position, allowing the user to insert the first capsule 2 in the standby position, perform manual switching of the first supporting element 21 to the active configuration and position the second capsule 3 on the first supporting element 21. Operation as described above may be started automatically when a predetermined time has elapsed after opening of the extraction chamber 6, or following a command issued by the operator to confirm that the two capsules 2, 3 have been loaded.

According to the second possibility, it may be the case that before giving the double supplying command the user must give a command for activating the apparatus 1 after which the electronic control unit 46 causes the first part 12 and the second part 13 to move to the home position. Only after insertion of the two capsules 2, 3 will the user give the command for supplying two beverages and will operation of the apparatus 1 proceed as described above.

If, in contrast, in the home condition, the apparatus 1 remains with the extraction chamber 6 open, the user can simply insert the first capsule 2 in the standby position, manually switch the first supporting element 21 to the active configuration, position the second capsule 3 on the first supporting element 21 and, finally, give the double supplying command.

Moving on to the fourth embodiment, the programming of the electronic control unit 46 may be similar to that described for the third embodiment. In fact, for the fourth embodiment too, it is possible that in the home condition the apparatus 1 may remain with the extraction chamber 6 open or closed. If the movement of the thrust element 42 is automatic in both directions, unlike in the third embodiment, the user does not need to move it.

Finally, it should be noticed that although this invention has been described exclusively with reference to the possibility of loading two capsules 2, 3 simultaneously in the apparatus, it may advantageously be used even coupled to feeders capable of feeding further capsules one after another to the insertion path. In that case, when a second capsule 3 has been inserted in the extraction chamber 6, there will again be a further capsule present immediately upstream of the infeed section 19, in turn ready to be loaded into the extraction unit.

This invention brings important advantages.

Thanks to this invention it was possible to provide an apparatus for making beverages by passing hot water in a capsule containing a food substance, that allows two capsules to be loaded in the apparatus before starting the supplying cycle.

Furthermore, thanks to this invention it was possible to provide an apparatus that allows two beverages to be made in a completely automatic way, one after another, using two capsules pre-loaded in the apparatus without any downtime. Finally, it should be noticed that this invention is relatively easy to produce and that even the cost linked to implementing the invention is not very high.

The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. An apparatus for making beverages by passing hot water in a capsule containing a food substance, comprising:
   an extraction unit (5) in which an extraction chamber (6) is made in which, in use, a capsule (2), (3) can be inserted, the extraction unit (5) in turn comprising a first part (12) and a second part (13), which are movable, at least one relative to the other, between a home position in which they are at a distance from one another and allow the positioning of a capsule (2), (3) between them and in which the extraction chamber (6) is open, and an extraction position in which they are coupled together and close the extraction chamber (6);

retaining means (14) for retaining the capsule (2), (3) between the first part (12) and the second part (13) when said parts are in the home position and during at least part of their shifting from the home position to the extraction position;

an insertion duct (18) for insertion of the capsule (2), (3) comprising a vertical main extension component and extending from an infeed section (19) to the retaining means (14), the insertion duct (18) forming the final stretch of a path for insertion of the capsules (2), (3) in the apparatus (1);

a closing element (20) positioned at the infeed section (19) and movable between a closed position in which it prevents the transit of a capsule (2), (3) through the infeed section (19) and a disengaged position in which it allows the transit of a capsule (2), (3);

means for making a beverage for, in use, making hot water circulate through a capsule (2), (3) contained in the closed extraction chamber (6), thereby causing the beverage to be formed, and for supplying the beverage to the outside of the apparatus (1); and at least one first supporting element (21) positioned along the insertion path, upstream of the infeed section (19), for supporting a second capsule (3) outside the extraction unit (5) while a first capsule (2) is positioned at the extraction chamber (6), the first supporting element (21) being switchable between an active configuration in which it can support a capsule (2), (3) and an inactive configuration in which a capsule (2), (3) positioned at it can freely advance towards the infeed section (19);

characterized in that:

the closing element (20) is operatively connected to the extraction unit (5) so that it is positioned in the closed position when the first part (12) and the second part (13) are in the extraction position, and in the disengaged position when the first part (12) and the second part (13) are in the home position;

the first supporting element (21) is in the inactive configuration when the first part (12) and the second part (13) are in the extraction position; and during the shifting of the first part (12) and of the second part (13) from the home position to the extraction position, and of the closing element (20) from the disengaged position to the closed position, one of either the first part (12) or the second part (13), or the closing element (20), mechanically acts on the first supporting element (21) to switch it from the active configuration to the inactive configuration.

2. The apparatus according to claim 1, wherein at least upstream of the infeed section (19) the insertion path comprises two opposite channels (23) in which in use a flange (16) projecting from the capsule (2), (3) can slide, and wherein, at least at one of the channels (23), the first supporting element (21) comprises at least one first tooth (24) which in the active configuration is positioned inside the self-same channel (23) to in use prevent the transit of the flange (16) of the capsule (2), (3) and which in the inactive configuration is positioned outside the channel (23).

3. The apparatus according to claim 2, wherein the first supporting element (21) comprises two opposite first teeth (24), each positioned at one of the channels (23).

4. The apparatus according to claim 2, also comprising at least one second supporting element (35) for supporting a capsule (2), (3) outside the extraction unit (5) when the first part (12) and the second part (13) are in the extraction position, the second supporting element (35) being positioned along the insertion path upstream of the infeed section (19) and downstream of the first supporting element (21), and being switchable between an operating configuration in which it is able to support a capsule (2), (3) and a non-operating configuration in which a capsule (2), (3) positioned at it can freely advance towards the infeed section (19); wherein during the shifting of the first part (12) and of the second part (13) respectively from the home position to the extraction position and vice versa, and of the closing element (20) respectively from the disengaged position to the closed position and vice versa, one of either the first part (12) or the second part (13), or the closing element (20) mechanically acts on the second supporting element (35) to switch it respectively from the non-operating configuration to the operating configuration and vice versa; and wherein the second supporting element (21) is in the operating configuration when the first part (12) and the second part (13) are in the extraction position and in the non-operating configuration when the first part (12) and the second part (13) are in the home position, wherein at least at one of the channels (23) the second supporting element (35) comprises at least one second tooth (36) which in the operating configuration is positioned inside the self-same channel (23) for in use preventing the transit of the flange (16) of the capsule (2), (3) and which in the non-operating configuration is positioned outside the channel (23).

5. The apparatus according to claim 4, wherein the second supporting element (35) comprises two opposite second teeth (36), each positioned at one of the channels (23).

6. The apparatus according to claim 1, wherein the first supporting element (21) is mounted on a slide (25) translatable orthogonally to a line of extension of the insertion path.

7. The apparatus according to claim 6, also comprising at least one second supporting element (35) for supporting a capsule (2), (3) outside the extraction unit (5) when the first part (12) and the second part (13) are in the extraction position, the second supporting element (35) being positioned along the insertion path upstream of the infeed section (19) and downstream of the first supporting element (21), and being switchable between an operating configuration in which it is able to support a capsule (2), (3) and a non-operating configuration in which a capsule (2), (3) positioned at it can freely advance towards the infeed section (19); wherein during the shifting of the first part (12) and of the second part (13) respectively from the home position to the extraction position and vice versa, and of the closing element (20) respectively from the disengaged position to the closed position and vice versa, one of either the first part (12) or the second part (13), or the closing element (20) mechanically acts on the second supporting element (35) to switch it respectively from the non-operating configuration to the operating configuration and vice versa; and wherein the second supporting element (21) is in the operating configuration when the first part (12) and the second part (13) are in the extraction position and in the non-operating configuration when the first part (12) and the second part (13) are in the home position, wherein the second supporting element (35) is also mounted on said slide (25).

8. The apparatus according to claim 1, wherein the first supporting element (21) is movable, and is switchable between the active configuration and the inactive configuration by means of a shifting of it, and wherein in the active configuration the first supporting element (21) is positioned in an active position in which it intercepts the advancing path and in the inactive configuration it is positioned in an inactive position in which it does not interfere with the insertion path.

9. The apparatus according to claim 8, wherein, when the first part (12) and the second part (13) are in the home position, the first supporting element (21) is manually shiftable from the inactive position to the active position.

10. The apparatus according to claim 9, also comprising
a motor (43) operatively connected the first part (12) and to the second part (13) for moving them between the home position and the extraction position;
an interface (45) through which a user can at least partly control operation of the apparatus (1), comprising at least one control for supplying two beverages one after another; and
an electronic control unit (46) connected to the interface (45), to the motor (43) and to the beverage making means for controlling operation of the apparatus (1) depending on commands given by the user;
and wherein, when the user uses the interface (45) to give the command for supplying two beverages one after another, the electronic control unit (46) is programmed to in use carry out the following operating steps one after another:
starting from a situation in which the first part (12) and the second part (13) are in the home position, to shift the first part (12) and the second part (13) into the extraction position, clamping in the supplying chamber a first capsule (2), previously retained by the retaining means (14), at the same time causing a corresponding shifting of the closing element (20) from the disengaged position to the closed position;
simultaneously, by means of said shifting of the first part (12) and of the second part (13) or of the closing element (20), causing a switching of the first supporting element (21) from the active configuration to the inactive configuration, allowing a second capsule (3) previously supported by the self-same first supporting element (21) to advance along the insertion path towards the infeed section (19);
supplying a first beverage using the first capsule (2);
returning the first part (12) and the second part (13) to the home position with consequent outfeed of the first capsule (2) from the extraction chamber (6), causing a corresponding shifting of the closing element (20) from the closed position to the disengaged position, and allowing the arrival of the second capsule (3) as far as the retaining means (14);
again shifting the first part (12) and the second part (13) into the extraction position, clamping the second capsule (3) in the supplying chamber, at the same time causing a new shifting of the closing element (20) from the disengaged position to the closed position; and
supplying a second beverage using the second capsule (3);
and wherein, when the user uses the interface (45) to give the command for supplying two beverages one after another, said step of switching the first supporting element (21) from the active configuration to the inactive configuration comprises shifting of the first supporting element (21) from the active position in which it previously had been placed manually, to the inactive position.

11. The apparatus according to claim 1, wherein during the shifting of the first part (12) and of the second part (13) from the extraction position to the home position, and of the closing element (20) from the closed position to the disengaged position, one of either the first part (12) or the second part (13), or the closing element (20) mechanically acts on the first supporting element (21) to switch it from the inactive configuration to the active configuration, and wherein the first supporting element (21) is in the active configuration when the first part (12) and the second part (13) are in the home position.

12. The apparatus according to claim 1, also comprising at least one second supporting element (35) for supporting a capsule (2), (3) outside the extraction unit (5) when the first part (12) and the second part (13) are in the extraction position, the second supporting element (35) being positioned along the insertion path upstream of the infeed section (19) and downstream of the first supporting element (21), and being switchable between an operating configuration in which it is able to support a capsule (2), (3) and a non-operating configuration in which a capsule (2), (3) positioned at it can freely advance towards the infeed section (19); wherein during the shifting of the first part (12) and of the second part (13) respectively from the home position to the extraction position and vice versa, and of the closing element (20) respectively from the disengaged position to the closed position and vice versa, one of either the first part (12) or the second part (13), or the closing element (20) mechanically acts on the second supporting element (35) to switch it respectively from the non-operating configuration to the operating configuration and vice versa; and wherein the second supporting element (21) is in the operating configuration when the first part (12) and the second part (13) are in the extraction position and in the non-operating configuration when the first part (12) and the second part (13) are in the home position.

13. The apparatus according to claim 12, wherein the second supporting element (35) is movable, and is switchable between the operating configuration and the non-operating configuration by means of a shifting of it, and wherein in the operating configuration the second supporting element (35) is positioned in an operating position in which it intercepts the advancing path and in the non-operating configuration it is positioned in a non-operating position in which it does not interfere with the insertion path.

14. The apparatus according to claim 12, wherein when the user uses the interface (45) to give the command for supplying two beverages one after another, the electronic control unit (46) is also programmed to perform, starting from an initial situation with the first part (12) and the second part (13) in the supplying position, a preliminary step of shifting of the first part (12) and of the second part (13) into the home position, at the same time causing a corresponding shifting of the closing element (20) from the closed position to the disengaged position, and wherein, during the preliminary step, the shifting of the first part (12) and of the second part (13), or that of the closing element (20), causes the switching of the second supporting element (35) from the operating configuration in which it supports the first capsule (2), to the non-operating configuration thereby allowing the first capsule (2) to advance as far as the retaining means (14).

15. The apparatus according to claim 1, wherein the first supporting element (21) comprises a supporting body (39) for the capsule (2), (3) having a transit opening (40) for the capsule (2), (3) which is vertically aligned with the infeed section (19), and a seat (41) for the capsule (2), (3) positioned alongside the transit opening (40), and a thrust element (42) movable between a back position in which it allows positioning of a capsule (2), (3) on the seat (41), and a forward position, the shifting of the thrust element (42) from the back position to the forward position in use causing the shifting of a capsule (2), (3) positioned on the seat (41), from the self-same seat (41) to the transit opening (40), and wherein the positioning of the thrust element (42) in the back position corresponds to the active configuration of the first supporting element (21) and the positioning of the thrust element (42) in the forward position corresponds to the inactive configuration of the first supporting element (21).

16. The apparatus according to claim 15, also comprising:
a motor (43) operatively connected the first part (12) and to the second part (13) for moving them between the home position and the extraction position;
an interface (45) through which a user can at least partly control operation of the apparatus (1), comprising at least one control for supplying two beverages one after another; and
an electronic control unit (46) connected to the interface (45), to the motor (43) and to the beverage making means for controlling operation of the apparatus (1) depending on commands given by the user;
and wherein, when the user uses the interface (45) to give the command for supplying two beverages one after another, the electronic control unit (46) is programmed to in use carry out the following operating steps one after another:
starting from a situation in which the first part (12) and the second part (13) are in the home position, to shift the first part (12) and the second part (13) into the extraction position, clamping in the supplying chamber a first capsule (2), previously retained by the retaining means (14), at the same time causing a corresponding shifting of the closing element (20) from the disengaged position to the closed position;
simultaneously, by means of said shifting of the first part (12) and of the second part (13) or of the closing element (20), causing a switching of the first supporting element (21) from the active configuration to the inactive configuration, allowing a second capsule (3) previously supported by the self-same first supporting element (21) to advance along the insertion path towards the infeed section (19);
supplying a first beverage using the first capsule (2);
returning the first part (12) and the second part (13) to the home position with consequent outfeed of the first capsule (2) from the extraction chamber (6), causing a corresponding shifting of the closing element (20) from the closed position to the disengaged position, and allowing the arrival of the second capsule (3) as far as the retaining means (14);
again shifting the first part (12) and the second part (13) into the extraction position, clamping the second capsule (3) in the supplying chamber, at the same time causing a new shifting of the closing element (20) from the disengaged position to the closed position; and
supplying a second beverage using the second capsule (3);
and wherein, when the user uses the interface (45) to give the command for supplying two beverages one after another, said step of switching the first supporting element (21) from the active configuration to the inactive configuration comprises the shifting of the thrust element (42) from the back position to the forward position and the shifting of the second capsule (3), that was previously positioned resting on the seat (41), as far as the transit opening (40) through which it then reaches the infeed section (19) and the retaining means (14).

17. The apparatus according to claim 1, also comprising:
a motor (43) operatively connected the first part (12) and to the second part (13) for moving them between the home position and the extraction position;
an interface (45) through which a user can at least partly control operation of the apparatus (1), comprising at least one control for supplying two beverages one after another; and
an electronic control unit (46) connected to the interface (45), to the motor (43) and to the beverage making means for controlling operation of the apparatus (1) depending on commands given by the user;
and wherein, when the user uses the interface (45) to give the command for supplying two beverages one after another, the electronic control unit (46) is programmed to in use carry out the following operating steps one after another:
starting from a situation in which the first part (12) and the second part (13) are in the home position, to shift the first part (12) and the second part (13) into the extraction position, clamping in the supplying chamber a first capsule (2), previously retained by the retaining means (14), at the same time causing a corresponding shifting of the closing element (20) from the disengaged position to the closed position;
simultaneously, by means of said shifting of the first part (12) and of the second part (13) or of the closing element (20), causing a switching of the first supporting element (21) from the active configuration to the inactive configuration, allowing a second capsule (3) previously supported by the self-same first supporting element (21) to advance along the insertion path towards the infeed section (19);
supplying a first beverage using the first capsule (2);
returning the first part (12) and the second part (13) to the home position with consequent outfeed of the first capsule (2) from the extraction chamber (6), causing a corresponding shifting of the closing element (20) from the closed position to the disengaged position, and allowing the arrival of the second capsule (3) as far as the retaining means (14);
again shifting the first part (12) and the second part (13) into the extraction position, clamping the second capsule (3) in the supplying chamber, at the same time causing a new shifting of the closing element (20) from the disengaged position to the closed position; and
supplying a second beverage using the second capsule (3).

18. The apparatus according to claim 17, wherein when the user uses the interface (45) to give the command for supplying two beverages one after another, the electronic control unit (46) is also programmed to perform, starting from an initial situation with the first part (12) and the second part (13) in the supplying position, a preliminary step of shifting of the first part (12) and of the second part (13) into the home position, at the same time causing a corresponding shifting of the closing element (20) from the closed position to the disengaged position.

19. The apparatus according to claim 18, wherein, during said preliminary step, the shifting of the first part (12) and of the second part (13), or that of the closing element (20), causes the transit of the first capsule (2), previously positioned resting on the closing element (20) positioned in the closed position, through the infeed section (19) and its arrival as far as the retaining means (14).

20. The apparatus according to claim 19, wherein, during the preliminary step, the shifting of the first part (12) and of the second part (13), or that of the closing element (20), causes switching of the first supporting element (21) from the inactive configuration to the active configuration in such a way that, after the advancing of the first capsule (2) towards the insertion means, the first supporting element (21) can support a second capsule (3) that was previously supported directly by the first capsule (2).

* * * * *